US009409567B2

(12) United States Patent
Otake

(10) Patent No.: US 9,409,567 B2
(45) Date of Patent: Aug. 9, 2016

(54) DRIVING ASSISTANCE APPARATUS

(75) Inventor: Hirotada Otake, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 105 days.

(21) Appl. No.: 13/261,865

(22) PCT Filed: Nov. 14, 2011

(86) PCT No.: PCT/JP2011/076210
§ 371 (c)(1),
(2), (4) Date: May 14, 2014

(87) PCT Pub. No.: WO2013/072996
PCT Pub. Date: May 23, 2013

(65) Prior Publication Data
US 2014/0335994 A1 Nov. 13, 2014

(51) Int. Cl.
B60W 20/00 (2016.01)
B60W 10/06 (2006.01)
F02D 29/02 (2006.01)
(Continued)

(52) U.S. Cl.
CPC ............ B60W 20/40 (2013.01); B60W 10/06 (2013.01); B60W 20/00 (2013.01); B60W 30/181 (2013.01); F02D 29/02 (2013.01); F02N 11/0837 (2013.01); B60W 2030/1809 (2013.01); B60W 2550/143 (2013.01); B60W 2550/402 (2013.01); B60W 2720/103 (2013.01); Y02T 10/48 (2013.01); Y10S 903/903 (2013.01); Y10T 477/23 (2015.01); Y10T 477/675 (2015.01)

(58) Field of Classification Search
CPC ..... B60W 10/06; B60W 20/00; B60W 20/40; B60W 30/181; B60W 2550/143; B60W 2550/402; B60W 2550/406; B60W 2550/408; B60W 2720/103; B60W 2750/30; B60W 2750/306; B60W 2750/308; B60W 2750/40; Y10S 903/903; F02D 29/02; F02N 11/0837; Y10T 477/23; Y10T 477/675; Y02T 10/48
See application file for complete search history.

(56) References Cited

U.S. PATENT DOCUMENTS 5,451,820 A * 9/1995 Gotoh ................ B60K 31/0008
123/179.4
8,532,843 B2 * 9/2013 Nagura ............... F02N 11/0837
123/179.4
(Continued)

FOREIGN PATENT DOCUMENTS

JP 2001 304008 10/2001
JP 2004 84484 3/2004
JP 2004 239127 8/2004
(Continued)

OTHER PUBLICATIONS

International Search Report Issued Dec. 6, 2011 in PCT/JP11/076210 Filed Nov. 14, 2011.

Primary Examiner — Jacob S Scott
(74) Attorney, Agent, or Firm — Oblon, McClelland, Maier & Neustadt, L.L.P.

(57) ABSTRACT

A driving assistance apparatus includes an assistance control unit determining an on/off state of an engine and a drive control unit controlling driving of the engine on the basis of the on/off state determined by the assistance control unit. The assistance control unit determines whether a vehicle stops at a target stopping position, and carries out setting such that the engine is more easily switched from the on state to the off state when the assistance control unit determines to stop at the target stopping position and it is timing at which the vehicle is able to reach the target stopping position in a state where driving force is not generated.

14 Claims, 10 Drawing Sheets

(51) Int. Cl.
  *F02N 11/08* (2006.01)
  *B60W 30/18* (2012.01)

(56) References Cited

U.S. PATENT DOCUMENTS

| | | | |
|---|---|---|---|
| 9,074,572 B2* | 7/2015 | Albertson | B60W 10/06 |
| 2011/0153119 A1* | 6/2011 | Lee | F02N 11/0837 |
| | | | 701/2 |
| 2011/0307122 A1* | 12/2011 | Kanning | B60W 30/18072 |
| | | | 701/1 |
| 2013/0297124 A1* | 11/2013 | Be | G06F 17/00 |
| | | | 701/22 |

FOREIGN PATENT DOCUMENTS

| | | |
|---|---|---|
| JP | 2008 296798 | 12/2008 |
| JP | 2010 143304 | 7/2010 |
| JP | 2010 202119 | 9/2010 |
| JP | 2011 84137 | 4/2011 |

* cited by examiner

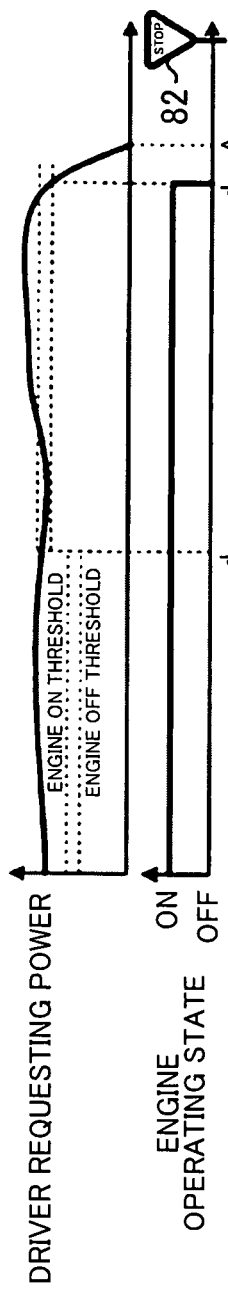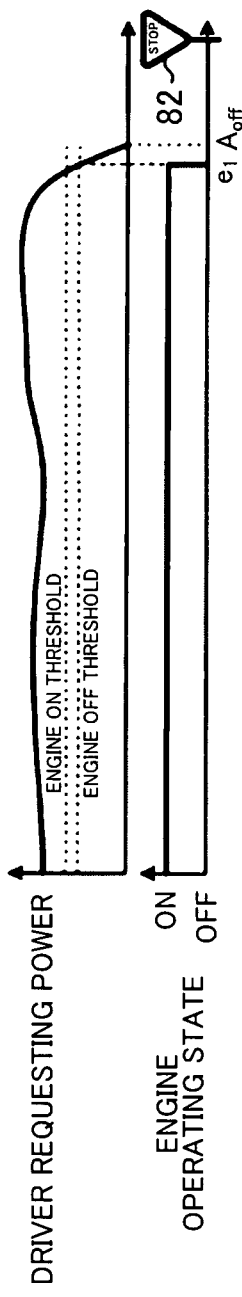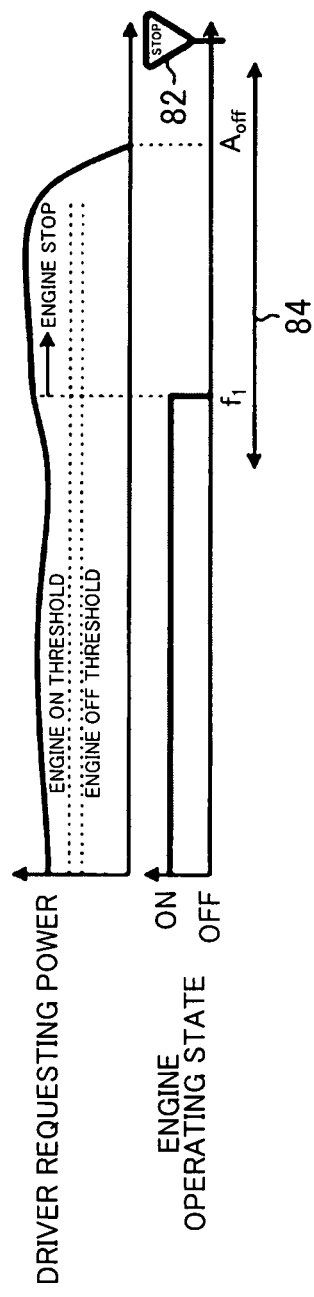

DRIVING ASSISTANCE APPARATUS

TECHNICAL FIELD

The invention relates to a driving assistance apparatus.

BACKGROUND ART

Conventionally, there is known a driving assistance apparatus that is mounted on a vehicle and that assists the vehicle in traveling. For example, Patent Document 1 describes a drive control apparatus for a hybrid vehicle including a motor and an engine as drive sources of the vehicle. The drive control apparatus includes drive selection means for selecting whether to drive only the motor or to drive at least the engine on the basis of an operating condition, signal recognition means for recognizing the state of a traffic light ahead of the vehicle traveling, and engine drive limiting means for prohibiting driving of the engine when a predetermined condition is satisfied in the case where a red light of a traffic light is recognized while the vehicle is traveling.

Patent Document 2 describes a hybrid vehicle that sets a starting threshold and a stopping threshold such that the starting threshold and the stopping threshold reduce as a vehicle speed increases and also reduce as the temperature of a battery decreases, that travels on power from an engine and power from a motor by automatically starting the engine when an engine command power required for the engine has reached the starting threshold or higher while traveling in a state where the operation of the engine is stopped, and that travels on power from the motor by automatically stopping the engine when the engine command power becomes lower than the stopping threshold while traveling in a state where the engine is operated.

RELATED ART DOCUMENT

Patent Document

Patent Document 1: Japanese Patent Application Publication No. 2004-239127 (JP 2004-239127 A)
Patent Document 2: Japanese Patent Application Publication No. 2011-84137 (JP 2011-84137 A)

SUMMARY OF THE INVENTION

Problem to be Solved by the Invention

The devices described in Patent Document 1 and Patent Document 2 improve fuel economy by switching between the on/off states of the engine and performing traveling in a state where the engine is set in the off state. Here, the devices described in Patent Document 1 and Patent Document 2 have room for further improvement in terms of an assisting process for driving assistance at the time of stopping at a stopping position and fuel economy. For example, when driving assistance is carried out by the devices described in Patent Document 1 and Patent Document 2, there is a case that it is required to increase an accelerator operation amount in order to reach a stopping position. In addition, when driving assistance is carried out by the devices described in Patent Document 1 and Patent Document 2, there may be a limit of improvement in fuel economy.

The invention is contemplated in view of the above-described situation, and it is an object of the invention to provide a driving assistance apparatus that is able to cause a vehicle to travel to a stopping position with driving assistance at the time of stopping at the stopping position and that is able to improve fuel economy.

Means for Solving the Problem

In order to achieve the above object, the invention provides a driving assistance apparatus that assists a vehicle, including an engine, in traveling. The driving assistance apparatus includes an assistance control unit determining an on/off state of the engine and a drive control unit controlling driving of the engine on the basis of the on/off state determined by the assistance control unit. The assistance control unit determines whether the vehicle stops at a target stopping position. The assistance control unit carries out setting such that the engine is more easily switched from the on state to the off state when the assistance control unit determines to stop at the target stopping position and it is timing at which the vehicle is able to reach the target stopping position in a state where driving force is not generated.

Preferably, the assistance control unit acquires a driver requesting power, and switches the engine from the on state to the off state when the driver requesting power is lower than or equal to a threshold, and the assistance control unit determines to stop at the target stopping position and calculates a position at which a threshold for setting the engine to the off state to a higher value with reference to a position at which the vehicle is able to reach the target stopping position in coasting.

Preferably, the assistance control unit detects an accelerator operation state, and detects the driver requesting power on the basis of the accelerator operation state.

Preferably, the assistance control unit calculates timing at which the vehicle is able to reach the target stopping position in coasting on the basis of a current vehicle speed, a deceleration during coasting and a distance to the target stopping position.

Preferably, timing at which the vehicle is able to reach the target stopping position in coasting is timing of passage of a position at which the vehicle is able to reach the target stopping position in coasting.

Preferably, the assistance control unit calculates timing at which the vehicle is able to reach the target stopping position in a state where driving force is not generated under a condition that the vehicle travels in coasting to a brake deceleration start position at which braking is started before the target stopping position.

Preferably, the vehicle includes a motor generator that serves as a driving source and a battery that supplies electric power to the motor generator, and the assistance control unit determines to stop at the target stopping position when a state of charge of the battery is lower than a threshold, and prohibits switching into setting such that the engine is more easily switched from the on state to the off state when it is the timing at which the vehicle is able to reach the target stopping position in a state where driving force is not generated.

Effect of the Invention

The driving assistance apparatus according to the invention has such an advantageous effect that it is possible to cause a vehicle to travel to a stopping position with driving assistance at the time of stopping at the stopping position and that is able to improve fuel economy.

BRIEF DESCRIPTION OF THE DRAWINGS

FIG. 6A is a schematic view that shows an example of the correlation among a residual distance to a stopping position, a driver requesting power and an engine operating state in the vehicle control system.

FIG. 6B is a schematic view that shows a reference example of the correlation among a residual distance to the stopping position, a driver requesting power and an engine operating state in the vehicle control system.

FIG. 6C is a schematic view that shows a reference example of the correlation among a residual distance to the stopping position, a driver requesting power and an engine operating state in the vehicle control system.

MODES FOR CARRYING OUT THE INVENTION

Hereinafter, an embodiment of the invention will be described in detail with reference to the drawings. The invention is not limited by the embodiment. Components in the following embodiment encompass components that are easily replaceable by persons skilled in the art or substantially identical components.

First Embodiment

Figure 1:
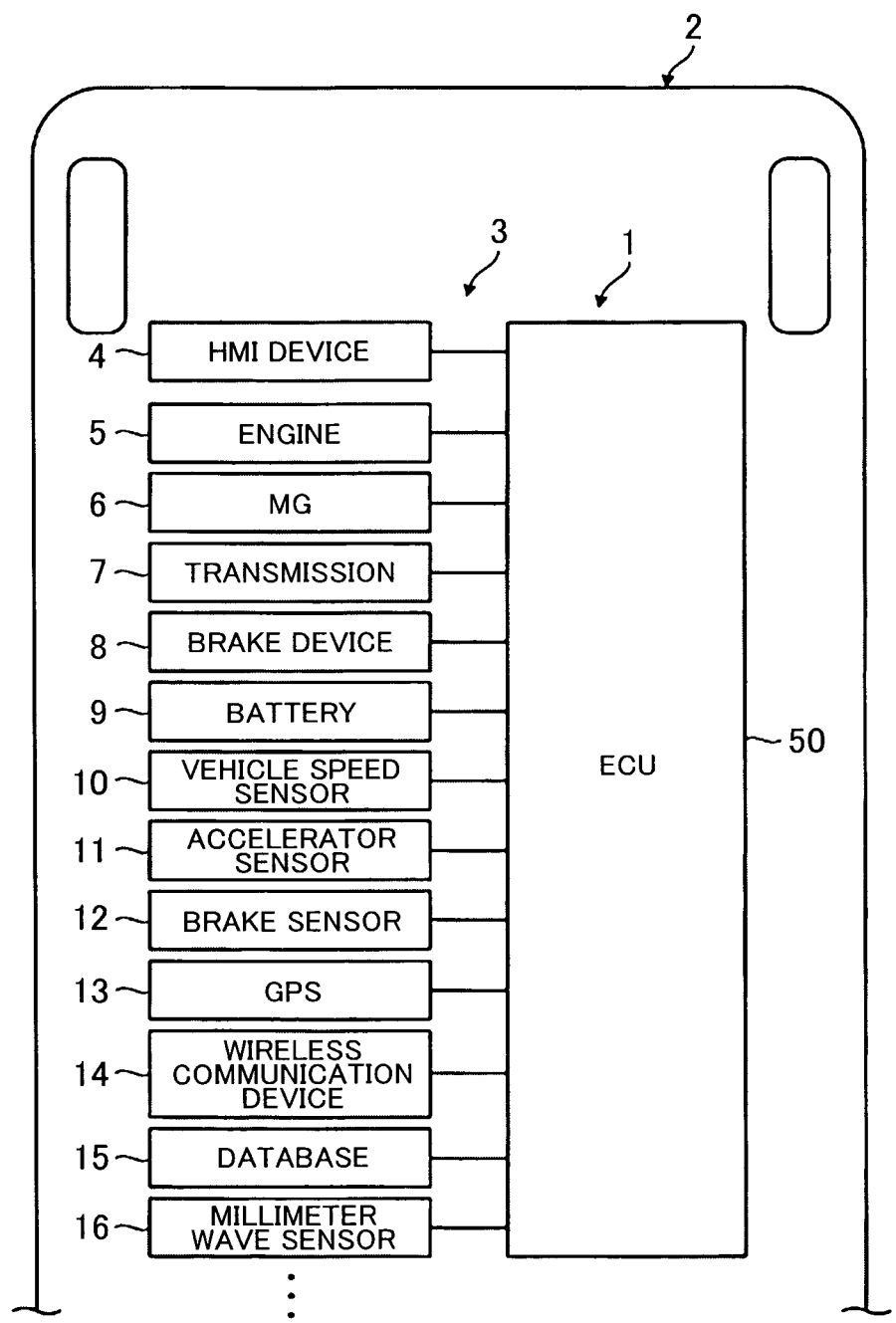
FIG. 1 is a schematic configuration view that shows a vehicle control system.
Figure 2:
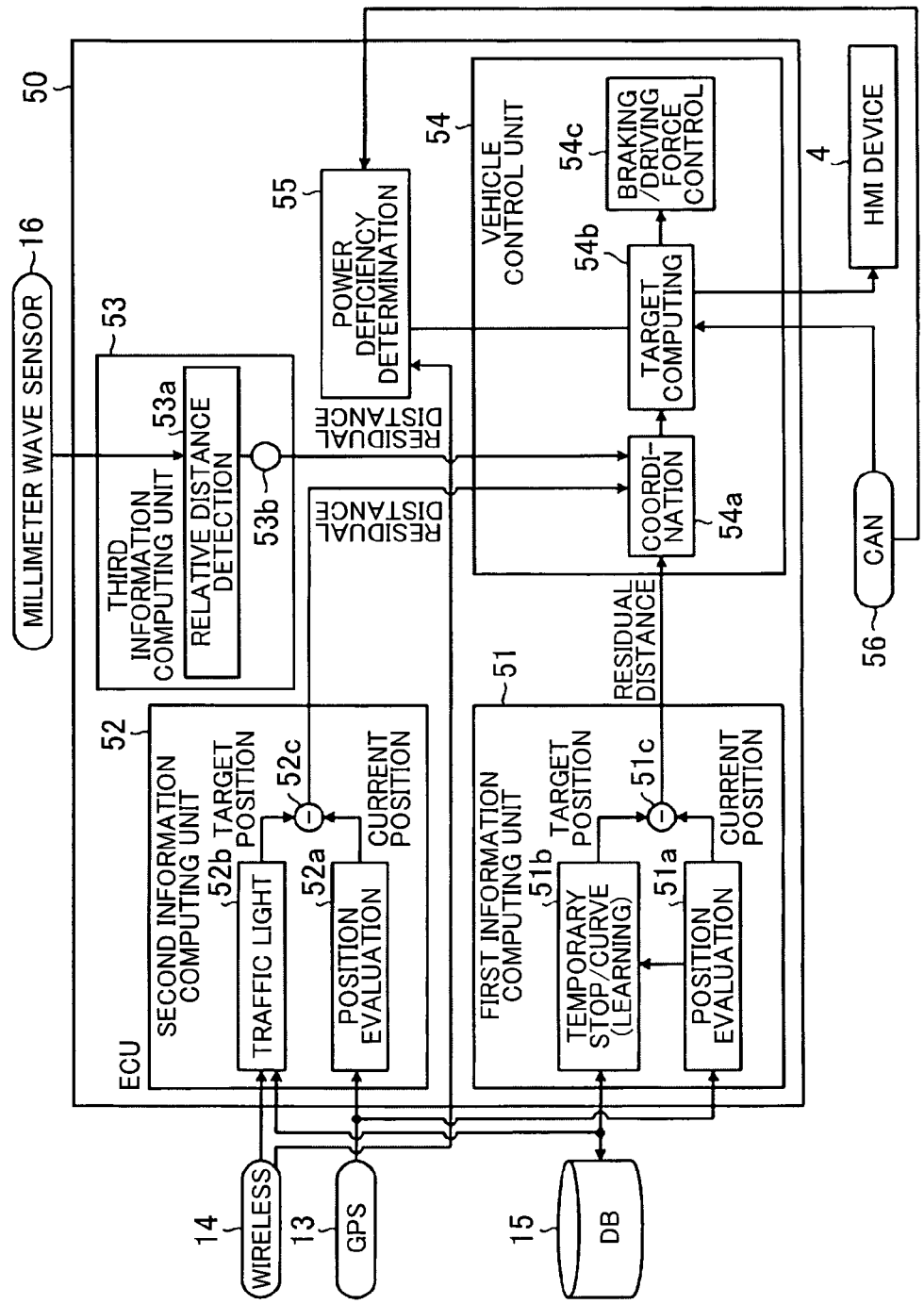
FIG. 2 is a block diagram that shows an example of the schematic configuration of an ECU.
Figure 3:
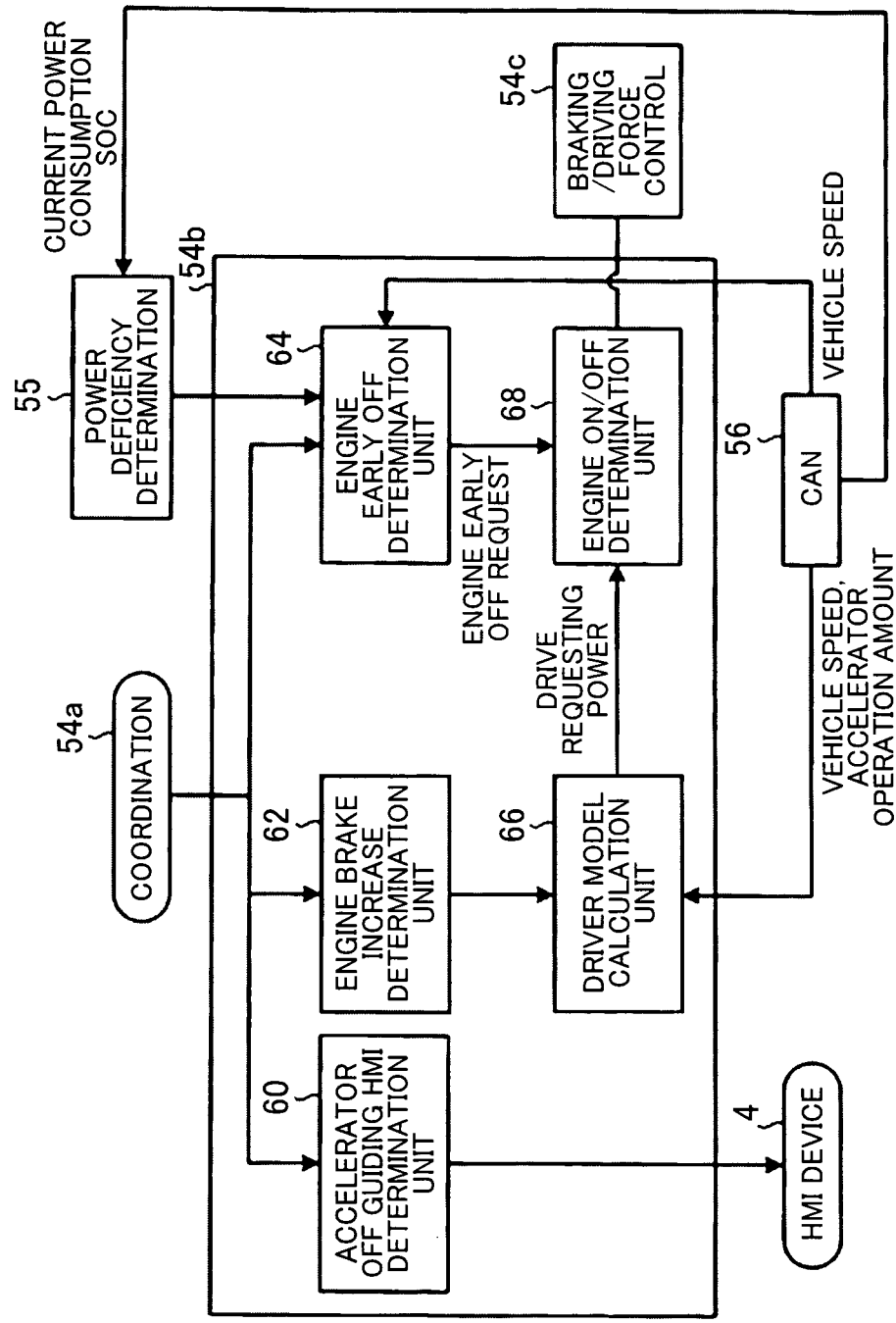
FIG. 3 is a block diagram that shows an example of the schematic configuration of a target computing unit.

FIG. 1 is a schematic configuration view that shows a vehicle control system according to a first embodiment. FIG. 2 is a block diagram that shows an example of the schematic configuration of an ECU according to the first embodiment. FIG. 3 is a block diagram that shows an example of the schematic configuration of a target computing unit.

A driving assistance apparatus 1 according to the present embodiment is applied to the vehicle control system 3 mounted on a vehicle 2, as shown in FIG. 1. The driving assistance apparatus 1 includes the ECU (electronic control unit) 50. The driving assistance apparatus 1 assists the vehicle 2 in traveling by carrying out various driving assists through control of the ECU 50 over an HMI device 4 in response to a situation.

The vehicle control system 3 to which the driving assistance apparatus 1 according to the present embodiment is applied is a look-ahead information economy driving assistance system that utilizes so-called look-ahead information. That is, the vehicle control system 3 assists economy driving (eco-drive) in the following manner. The driving assistance apparatus 1 carries out driving with a high fuel economy improving effect by utilizing the look-ahead information. Thus, the vehicle control system 3 is a system configured to improve fuel economy by suppressing consumption of fuel. The driving assistance apparatus 1 according to the present embodiment switches between the on/off states of an engine at the time of stopping the travel as driving assistance. Furthermore, the driving assistance apparatus 1 guides and assists driver's operation by outputting driving assistance information for the purpose of assisting driver's economy driving.

The vehicle control system 3 according to the present embodiment is a so-called hybrid system that combines an engine 5 with an MG 6 to serve as a driving source for rotationally driving drive wheels of the vehicle 2. That is, the vehicle 2 is a hybrid vehicle that includes the MG 6 as a driving source in addition to the engine 5. The vehicle 2 is configured to operate the engine 5 in an efficient state as high as possible and to achieve improvement in fuel economy by compensating for excess and deficiency of power or engine braking force with the use of the MG 6 that serves as a rotary electric machine and further regenerating energy during deceleration.

Specifically, the vehicle control system 3 includes the HMI device 4, the engine 5 that serves as an internal combustion engine, the motor generator (hereinafter, may be referred to as "MG") 6 that serves as an electric motor, a transmission 7, a brake device 8, a battery 9, and the like. The vehicle control system 3 includes a vehicle speed sensor 10, an accelerator sensor 11, a brake sensor 12, a GPS (global positioning system) (hereinafter, may be referred to as "GPS") 13, a wireless communication device 14, a database (hereinafter, may be referred to as "DB") 15, a millimeter wave sensor 16, and the like.

The HMI device 4 is an assistance device that is able to output driving assistance information that is information for assisting driving of the vehicle 2, and is a device that, for example, provides driving assistance information to a driver. The HMI device 4 is an in-vehicle device, and, for example, includes a display device (visual information display device), a speaker (audio output device), and the like, provided in a vehicle cabin of the vehicle 2. An existing device, such as a display device, a speaker, and the like, of a navigation system, may be used as the HMI device 4. The HMI device 4 provides information through audio information, visual information (graphic information, character information), or the like, such that it is possible to achieve improvement in fuel economy, and guides driver's driving operation. The HMI device 4 assists achieving a target value through driver's driving operation by providing such information. The HMI device 4 is electrically connected to the ECU 50, and is controlled by the ECU 50. The HMI device 4 may be configured to include, for example, a tactile sense information output device that outputs tactile sense information, such as steering wheel vibrations, seat vibrations, pedal reaction force, and the like.

The vehicle control system 3 includes the engine 5, the MG 6, the transmission 7, the brake device 8, the battery 9, and the like, as various actuators for causing the vehicle 2 to travel.

The engine 5 is to cause driving force to act on wheels of the vehicle 2 in response to driver's acceleration requesting operation, such as depressing operation of an accelerator pedal. The engine 5 generates engine torque as driving power that is caused to act on the drive wheels of the vehicle 2 by consuming fuel. In short, the engine 5 is a heat engine that outputs thermal energy, generated by burning fuel, in form of mechanical energy, such as torque, and a gasoline engine, a diesel engine, an LPG engine, or the like, is one example of the engine 5. The engine 5, for example, includes a fuel injection device, an ignition device, a throttle valve device (which are not shown), and the like. These devices are electrically connected to the ECU 50, and are controlled by the ECU 50. The output torque of the engine 5 is controlled by the ECU 50. Power that is generated by the engine 5 may be used to generate electric power in the MG 6.

The MG 6 is to cause driving force to act on the wheels of the vehicle 2 in response to driver's acceleration requesting operation, such as depressing operation of the accelerator pedal. The MG 6 generates motor torque as driving power that is caused to act on the drive wheels of the vehicle 2 by converting electric energy to mechanical power. The MG 6 is a so-called rotary electric machine that includes a stator serving as a fixed element and a rotor serving as a rotating element. The MG 6 is an electric motor that converts electric energy to mechanical power and outputs the mechanical power and is also a generator that converts mechanical power to electric energy and recovers the electric energy. That is, the MG 6 has both the function of the electric motor (power running function) that is driven by electric power supplied, converts electric energy to mechanical energy and outputs the mechanical energy and the function of the generator (regeneration function) that converts mechanical energy to electric energy. The MG 6 is electrically connected to the ECU 50 via an inverter, or the like, that carries out conversion between direct current and alternating current, and is controlled by the ECU 50. The output torque of the MG 6 and the amount of electric power generated by the MG 6 are controlled by the ECU 50 via the inverter.

The transmission 7 is a power transmission device that shifts rotation output from the engine 5 or the MG 6 in speed and transmits the rotation to the drive wheels side of the vehicle 2. The transmission 7 may be a so-called manual transmission (MT), or may be a so-called automatic transmission, such as a step-shift automatic transmission (AT), a continuously variable automatic transmission (CVT), a multi-mode manual transmission (MMT), a sequential manual transmission (SMT) and a dual clutch transmission (DCT). Here, description will be made on the assumption that the transmission 7 is, for example, a continuously variable transmission that uses a planetary gear mechanism, and the like. A transmission actuator, and the like, of the transmission 7 are electrically connected to the ECU 50, and are controlled by the ECU 50.

The brake device 8 is to cause braking force to act on the wheels of the vehicle 2 in response to driver's braking requesting operation, such as depressing operation of a brake pedal. The brake device 8, for example, applies braking force to the wheels rotatably assisted by the body of the vehicle 2 by generating a predetermined friction force (friction resistance force) between friction elements, such as a brake pad and a brake disk. Thus, the brake device 8 is able to generate braking force at contact faces of the wheels of the vehicle 2 with a road surface and brake the vehicle 2. A brake actuator, and the like, of the brake device 8 are electrically connected to the ECU 50, and are controlled by the ECU 50.

The battery 9 is an electrical storage device that is able to store electric power (power storage) and to discharge stored electric power. The battery 9 is electrically connected to the ECU 50, and outputs signals regarding various pieces of information to the ECU 50. The battery 9 according to the present embodiment detects an SOC (state of charge) as information about the state of charge.

When the MG 6 functions as the electric motor, the MG 6 is supplied with electric power stored in the battery 9 via the inverter, and converts supplied electric power to driving power of the vehicle 2 and outputs the driving power. When the MG 6 functions as a generator, the MG 6 is driven by input power to generate electric power, and charges the battery 9 with the generated electric power via the inverter. At this time, the MG 6 is able to brake (regeneratively brake) rotation of the rotor by rotational resistance that, occurs at the rotor. As a result, the MG 6 is able to generate motor regenerative torque, which is negative motor torque, at the rotor through regeneration of electric power during regenerative braking, and, as a result, is able to apply braking force to the drive wheels of the vehicle 2. That is, the vehicle control system 3 is able to recover the kinetic energy of the vehicle 2 as electric energy in the following manner. Mechanical power is input from the drive wheels of the vehicle 2 to the MG 6, and, therefore, the MG 6 generates electric power through regeneration. The vehicle control system 3 is able to carry out regenerative braking with the use of the MG 6 by transmitting mechanical power (negative motor torque), which is generated at the rotor of the MG 6 accordingly, to the drive wheels. In this case, in the vehicle control system 3, as the amount of electric power regenerated (amount of electric power generated) by the MG 6 is relatively reduced, generated braking force relatively reduces, and a deceleration that acts on the vehicle 2 relatively decreases. On the other hand, in the vehicle control system 3, as the amount of electric power regenerated (amount of electric power generated) by the MG 6 is relatively increased, generated braking force relatively increases, and a deceleration that acts on the vehicle 2 relatively increases.

The vehicle speed sensor 10, the accelerator sensor 11 and the brake sensor 12 are state detection devices that detect a traveling state of the vehicle 2 and driver's inputs (driver inputs) to the vehicle 2, that is, a state quantity and physical quantities associated with driver's actual operation to the vehicle 2. The vehicle speed sensor 10 detects the vehicle speed (hereinafter, may be referred to as "vehicle speed") of the vehicle 2. The accelerator sensor 11 detects the accelerator operation amount that is a driver's operation amount (depression amount) of the accelerator pedal. The brake sensor 12 detects a driver's operation amount (depression amount) of the brake pedal, for example, a master cylinder pressure, or the like. The vehicle speed sensor 10, the accelerator sensor 11 and the brake sensor 12 are electrically connected to the ECU 50, and output detected signals to the ECU 50.

The GPS 13 is a system that detects the current position of the vehicle 2. The GPS 13 receives GPS signals that are output from GPS satellites, and measures and computes GPS information (X coordinate; X, Y coordinate; Y) that are positional information of the vehicle 2 on the basis of the received GPS signals. The GPS 13 is electrically connected to the ECU 50, and outputs a signal about the GPS information to the ECU 50.

The wireless communication device 14 is a look-ahead information acquisition device that acquires look-ahead information about the travel of the vehicle 2 by utilizing wireless communication. The wireless communication device 14 acquires look-ahead information by utilizing wireless communication from, for example, a road-to-vehicle communication device (road-side device), such as an optical beacon, installed at a roadside, an inter-vehicle communication device mounted on another vehicle, a device that exchanges information by utilizing a communication infrastructure, such as the Internet, via a VICS (trademark) (vehicle information and communication system) center, or the like. The wireless communication device 14 acquires, for example, preceding vehicle information, following vehicle information, traffic light information, construction/traffic control information, traffic congestion information, emergency vehicle information, information about an accident history database, or the like, as the look-ahead information. For example, the traffic light information includes positional information of a traffic light ahead in the traveling direction of the vehicle 2, traffic light cycle information, such as the lighting cycle and light change timing of a green light, a yellow light and a red light, and the like. The wireless communication device 14 is electrically connected to the ECU 50, and outputs a signal about the look-ahead information to the ECU 50.

The database 15 is to store various pieces of information. The database 15 stores map information including road information, various pieces of information and learning information that are obtained from actual travel of the vehicle 2, look-ahead information that is acquired by the wireless communication device 14, and the like. For example, the road information includes road gradient information, road surface state information, road shape information, speed limit information, road curvature (curve) information, temporary stop information, stop line positional information, and the like. Information stored in the database 15 is consulted by the ECU 50 as needed, and required information is loaded. The database 15 is illustrated as being mounted on the vehicle 2 here; however, the database 15 is not limited to this configuration. The database 15 may be provided at an information center, or the like, outside the vehicle 2, the database 15 may be consulted by the ECU 50 as needed via wireless communication, or the like, and required information may be loaded. The database 15 according to the present embodiment accumulates information about positions (actually stopped positions) at which the vehicle 2 has stopped at traffic lights, intersections, and the like, provided with a reference stopping position, such as a stop line, as learning information. The database 15 accumulates information about the actually stopped position for each reference stopping position.

The millimeter wave sensor 16 is a sensor that measures a distance between the host vehicle and a preceding vehicle (a vehicle ahead of the vehicle 2). The millimeter wave sensor 16 irradiates millimeter wave-band radio waves forward of the vehicle 2, and receives radio waves of the irradiated radio waves, reflected from an object (preceding vehicle, vehicle ahead) and returned to the host device. The millimeter wave sensor 16 calculates a distance to the vehicle ahead by comparing an output condition of the irradiated radio waves with a detected result of the received radio waves. The millimeter wave sensor 16 may detect a distance to an obstacle ahead of the host vehicle. The millimeter wave sensor 16 transmits information about the calculated distance to the vehicle ahead to the ECU 50. In the present embodiment, the millimeter wave sensor 16 is used as a sensor that measures a distance between the host vehicle and a preceding vehicle (a vehicle ahead of the vehicle 2). Instead, various sensors that are able to measure a distance to an object ahead of the vehicle 2 may be used. For example, the vehicle 2 may use a laser radar sensor instead of the millimeter wave sensor 16.

The ECU 50 is a control unit that comprehensively controls the whole vehicle control system 3, and is, for example, configured as an electronic circuit that mainly includes a known microcomputer including a CPU, a ROM, a RAM and an interface. Electric signals corresponding to the detected results detected by the vehicle speed sensor 10, the accelerator sensor 11, the brake sensor 12 and the millimeter wave sensor 16, the GPS information acquired by the GPS 13, the look-ahead information acquired by the wireless communication device 14, the various pieces of information stored in the database 15, drive signals of various portions, control commands, and the like, are input to the ECU 50. The ECU 50 controls the HMI device 4, the engine 5, the MG 6, the transmission 7, the brake device 8, the battery 9, and the like, on the basis of these input electric signals, and the like. The ECU 50, for example, executes drive control over the engine 5, drive control over the MG 6, shift control over the transmission 7, braking control over the brake device 8, and the like, on the basis of the accelerator operation amount, the vehicle speed, and the like. The ECU 50 is, for example, able to achieve various vehicle drives (traveling modes) in the vehicle 2 by using both the engine 5 and the MG 6 or selectively using the engine 5 or the MG 6 on the basis of the operating state.

The ECU 50 is, for example, able to detect the on/off state and accelerator operation amount of accelerator operation, which is driver's acceleration requesting operation to the vehicle 2, on the basis of the detected result of the accelerator sensor 11. Similarly, the ECU 50 is, for example, able to detect the on/off state of brake operation, which is driver's braking requesting operation to the vehicle 2, on the basis of the detected result of the brake sensor 12. A state where driver's accelerator operation is in the off state is a state where the driver has released acceleration requesting operation to the vehicle 2. A state where driver's accelerator operation is in the on state is a state where the driver is conducting acceleration requesting operation to the vehicle 2. Similarly, a state where driver's brake operation is in the off state is a state where the driver has released braking requesting operation to the vehicle 2. A state where driver's brake operation is in the on state is a state where the driver is conducting braking requesting operation to the vehicle 2. The ECU 50 detects a driver requesting power on the basis of the accelerator operation amount.

A assistance control unit and drive control unit of the driving assistance apparatus 1 are configured by the ECU 50. The driving assistance apparatus 1 may include the HMI device 4, various sensors that detect vehicle states, and various information acquisition units that supply surrounding information, in addition to the ECU 50. The ECU 50 carries out various driving assists by controlling the engine 5 depending on a situation. Thus, the driving assistance apparatus 1 assists the driver in comfortable traveling, which is highly effective in improvement in fuel economy. Specifically, the driving assistance apparatus 1 acquires information about stopping positions, such as traffic lights and intersections, and determines whether it is required to stop in the traveling direction. When the driving assistance apparatus 1 determines to stop the vehicle 2, the driving assistance apparatus 1 identifies a target stopping position from information about the position of a stop line at a traffic light, an intersection, or the like, and controls the on/off state of the engine 5 on the basis of the travel speed of the traveling vehicle 2, a distance to the intended target stopping position and the driver requesting power input through driver's operation.

The ECU 50 outputs various pieces of driving assistance information by controlling the HMI device 4 depending on a situation. Thus, the driving assistance apparatus 1 carries out assistance for prompting the driver to conduct driving that is highly effective in improvement in fuel economy. The HMI device 4 outputs various pieces of driving assistance information in response to control of the ECU 50 on the basis of the target traveling state quantity of the traveling vehicle 2. Thus, the driving assistance apparatus 1 carries out guidance and assistance for prompting the driver to conduct recommended driving operation, typically, driving operation with a change. The target traveling state quantity is typically a target traveling state quantity of the vehicle 2 at a predetermined point or timing in the traveling vehicle 2. The ECU 50 controls the HMI device 4 on the basis of the target traveling state quantity at the predetermined point or timing, and the HMI device 4 outputs driving assistance information and prompts the driver to conduct recommended driving operation. Thus, the driving assistance apparatus 1 carries out driving assistance such that the traveling state quantity of the vehicle 2 becomes the target traveling state quantity at the predetermined point or timing.

The driving assistance apparatus 1 determines the target traveling state quantity, which is a predetermined traveling state at a predetermined position, on the basis of the target stopping position. The driving assistance apparatus 1 outputs driving assistance information on the basis of the target traveling state. The driving assistance apparatus 1 according to the present embodiment outputs driving assistance information to the HMI device 4 in visual information. Here, the target traveling state quantity is a target brake operation start vehicle speed as an example. The target brake operation start vehicle speed is a recommended vehicle speed at which driver's brake operation (braking requesting operation) is recommended. The recommended driving operation in which the driving assistance apparatus 1 guides and assists the driver is driver's accelerator off operation (releasing acceleration requesting operation) as an example. The driving assistance apparatus 1 displays visual information as driving assistance information as an image on a visual information display device, such as a center meter that constitutes the HMI device 4, a head-up display (HUD), on a windshield in a superimposed manner, and a liquid crystal display.

The vehicle 2 outputs information for instructions to carry out accelerator off operation as driving assistance information, and causes the driver to conduct accelerator off operation at the predetermined position. Thus, the vehicle speed becomes substantially the target brake operation start vehicle speed at the predetermined point. Because the vehicle speed becomes substantially the target brake operation start vehicle speed at the predetermined point, the vehicle 2 is able to smoothly stop near the target stopping position when the driver starts brake operation at the predetermined position at which the target brake operation start vehicle speed is attained. In this way, driving assistance information is output such that the vehicle 2 appropriately stops at the target stopping position corresponding to various conditions. Thus, the driving assistance apparatus 1 achieves appropriate driving assistance that suppresses a feeling of strangeness experienced by the driver in driving assistance.

Hereinafter, an example of the schematic configuration of the ECU 50 will be described with reference to the block diagram of FIG. 2. As illustrated in FIG. 2, the ECU 50 includes a first information computing unit 51, a second information computing unit 52, a third information computing unit 53, a vehicle control unit 54 and a power deficiency determination unit 55. In the ECU 50 according to the present embodiment, the first information computing unit 51, the second information computing unit 52, the third information computing unit 53, part of the vehicle control unit 54, and the power deficiency determination unit 55 constitute the assistance control unit. In addition, in the ECU 50, part of the vehicle control unit 54 constitutes the drive control unit. The first information computing unit 51, the second information computing unit 52 and the third information computing unit 53 are, for example, computing units compatible with ITS (intelligent transport systems), and computing units for carrying out infrastructure coordination and NAVI coordination. The vehicle control unit 54 is a control unit for controlling various portions of the vehicle 2. The vehicle control unit 54 is connected to actuator ECUs and sensors via a CAN (control area network) 56 constructed as an in-vehicle network. The actuator ECUs control various actuators, such as an engine control ECU, an MG control ECU, a transmission control ECU, a brake control ECU and a battery control ECU. The vehicle control unit 54 acquires control values of the various actuators and detected values of the sensors as vehicle information via the CAN 56. The ECU 50 is not limited to this configuration. The ECU 50 may, for example, include a NAVI device instead of the first information computing unit 51.

The first information computing unit 51 computes a residual distance from the vehicle 2 to a temporary stop or curve ahead in the traveling direction on the basis of static infrastructure information, such as map information including road information. The first information computing unit 51 learns driver's usual driving behavior, estimates a driving behavior on the basis of this, and also learns and predicts driver's deceleration stopping behavior. The first information computing unit 51 also computes a residual distance from the vehicle 2 to a deceleration stopping position ahead in the traveling direction. Here, the deceleration stopping position that is obtained by learning driver's usual driving behavior is, for example, a position at which the driver highly frequently decelerates to stop, other than a temporary stop, or the like.

The first information computing unit 51 just needs to learn driver's deceleration stopping behavior on the basis of various pieces of information, which are obtained in actual travel of the vehicle 2, that is, to learn a deceleration stopping position based on the driver. The first information computing unit 51, for example, learns the habit and tendency of driving operation from driver's usual driving on the basis of various pieces of information, which are obtained from actual travel of the vehicle 2, in association with a human (for example, driver's attribute), a place (for example, a position at which operation is conducted, or the like), a situation (for example, a time zone, or the like), and the like. The first information computing unit 51 learns a temporary stop, a deceleration stopping position at which the driver highly frequently decelerates to stop, and the like, by, for example, statistically processing the on/off states, and the like, of driver's accelerator operation and driver's brake operation. The first information computing unit 51 causes the database 15 to store the learned information as learning information.

The first information computing unit 51 functionally conceptually includes a position evaluation unit 51a, a temporary stop/curve information acquisition unit (hereinafter, may be referred to as "temporary stop/curve information acquisition unit") 51b, and a subtracter 51c. The position evaluation unit 51a acquires GPS information via the GPS 13, and acquires the current position information of the vehicle (host vehicle) 2. The position evaluation unit 51a outputs the current position information to the temporary stop/curve information acquisition unit 51b and the subtracter 51c. The temporary stop/curve information acquisition unit 51b acquires target position information indicating a temporary stop, a curve or a deceleration stopping position ahead in the traveling direction of the vehicle 2 by consulting the map information stored in the database 15 and the various pieces of information and learning information that are obtained in actual travel of the vehicle 2, on the basis of the current position information input from the position evaluation unit 51a. The temporary stop/curve information acquisition unit 51b outputs the target position information to the subtracter 51c. The subtracter 51c computes a difference between the position of the vehicle 2, indicated by the current position information input from the position evaluation unit 51a, and a temporary stop, a curve or a deceleration stopping position, indicated by the target position information input from the temporary stop/curve information acquisition unit 51b. Thus, the subtracter 51c computes a residual distance to the temporary stop, the curve or the deceleration stopping position. The subtracter 51c outputs residual distance information indicating the residual distance to a coordination unit 54a of the vehicle control unit 54.

The first information computing unit 51 may determine whether an estimated variation distance Y is set for an intended temporary stop or deceleration stopping position in the temporary stop/curve information acquisition unit 51b. When the first information computing unit 51 determines that the estimated variation distance Y is set for the intended temporary stop or deceleration stopping position in the temporary stop/curve information acquisition unit 51b, the first information computing unit 51 shifts the target position information indicating the target stopping position to a near side with respect to the reference stopping position (the position of the stop line of the intended temporary stop or deceleration stopping position) on the basis of the value of the estimated variation distance Y. The first information computing unit 51 computes a residual distance with reference to the changed target stopping position. Information about the estimated variation distance Y may be stored in the database 15. The estimated variation distance Y may be calculated from various conditions, information about a past actually stopped position, an elapsed time from turning into a red light, or the like.

The second information computing unit 52 computes a residual distance from the vehicle 2 to a stopping position due to a red light ahead in the traveling direction on the basis of dynamic infrastructure information, for example, traffic light information, and the like.

The second information computing unit 52 functionally conceptually includes a position evaluation unit 52a, a traffic light information acquisition unit 52b and a subtracter 52c. The position evaluation unit 52a acquires GPS information via the GPS 13, and acquires the current position information of the vehicle (host vehicle) 2. The position evaluation unit 52a outputs the current position information to the subtracter 52c. The traffic light information acquisition unit 52b acquires traffic light information via the wireless communication device 14, and acquires target position information indicating a stopping position due to a red light ahead in the traveling direction of the vehicle 2 on the basis of the traffic light information. The traffic light information acquisition unit 52b outputs the target position information to the subtracter 52c. The subtracter 52c computes a difference between the position of the vehicle 2, indicated by the current position information input from the position evaluation unit 52a, and the stopping position due to a red light, indicated by the target position information input from the traffic light information acquisition unit 52b, and computes a residual distance to the stopping position due to a red light. The subtracter 52c outputs residual distance information indicating the residual distance to the coordination unit 54a of the vehicle control unit 54.

The second information computing unit 52 may determine whether the estimated variation distance Y is set for the intended stopping position due to a red light (the position of a stop line corresponding to a traffic light) in the traffic light information acquisition unit 52b. When the second information computing unit 52 determines that the estimated variation distance Y is set for the intended stopping position due to a red light in the traffic light information acquisition unit 52b, the second information computing unit 52 shifts the target position information indicating the target stopping position to a near side with respect to the reference stopping position (the position of a stop line corresponding to a traffic light) on the basis of the value of the estimated variation distance Y. The second information computing unit 52 computes a residual distance with reference to the changed target stopping position. Information about the estimated variation distance Y may be stored in the database 15.

The third information computing unit 53 functionally conceptually includes a relative distance detection unit 53a and a conversion unit 53b. The relative distance detection unit 53a acquires the detected result of the millimeter wave sensor 16. The relative distance detection unit 53a detects whether there is a preceding vehicle on the basis of the detected result of the millimeter wave sensor 16, and, when there is a preceding vehicle, detects a relative distance to the preceding vehicle. The conversion unit 53b generates information for adjusting the residual distance from information about the relative distance to the preceding vehicle, calculated in the relative distance detection unit 53a. Specifically, the conversion unit 53b generates information for adjusting the residual distance, including instructions to further reduce the residual distance when the relative distance to the preceding vehicle is shorter than a set distance. The conversion unit 53b generates information for adjusting the residual distance, including instructions to keep the residual distance as it is when the relative distance to the preceding vehicle is longer than or equal to the set distance. That is, the conversion unit 53b generates information for adjusting the residual distance, including instructions to keep the residual distance as it is or instructions to reduce the residual distance, on the basis of the relative distance to the preceding vehicle. The conversion unit 53b may directly output the relative distance to the preceding vehicle, to the vehicle control unit 54.

The vehicle control unit 54 comprehensively controls the HMI device 4 and braking/driving force of the vehicle 2 on the basis of the residual distance to a temporary stop, a curve or a deceleration stopping position, computed by the first information computing unit 51, the residual distance to a stopping position due to a red light, computed by the second information computing unit 52, information based on the relationship of the preceding vehicle, computed by the third information computing unit 53, the vehicle speed of the vehicle 2, the on/off state of accelerator operation, the on/off state of brake operation, the accelerator operation amount, and the like.

The vehicle control unit 54 functionally conceptually includes the coordination unit 54a, a target computing unit 54b and a braking/driving force control unit 54c. The coordination unit 54a coordinates the residual distance information to a temporary stop, a curve or a deceleration stopping position, input from the subtracter 51c, the residual distance information to the stopping position due to a red light, input from the subtracter 52c, and the information for adjusting the residual distance based on the relationship with the preceding vehicle, input from the conversion unit 53b, with one another. The coordination unit 54a, for example, coordinates residual distance information on the basis of the accuracy of each piece of residual distance information, the magnitude relationship between the residual distances, and the like, and outputs the coordinated result to the target computing unit 54*b*. Here, when stopping assistance is carried out, the coordination unit 54*a* basically coordinates the residual distance information input from the subtracter 51*c* with the residual distance information input from the subtracter 52*c*, and determines a target on which stopping assistance is carried out. That is, the coordination unit 54*a* determines whether to stop at a stopping position of a temporary stop, such as an intersection with no traffic light, or to stop at a stopping position of a traffic light because the traffic light is red, and determines the residual distance. Furthermore, the coordination unit 54*a* generates residual distance information that is output to the target computing unit 54*b* by adjusting the determined residual distance on the basis of the information for adjusting the residual distance based on the relationship with the preceding vehicle, input from the conversion unit 53*b*.

The target computing unit 54*b* computes a target traveling state quantity on the basis of, for example, the coordinated result of the residual distance information, input from the coordination unit 54*a*, and a vehicle speed Vx of the vehicle 2, input from the vehicle speed sensor 10 via the CAN 56, or the like. The target computing unit 54*b* determines the on/off state of the engine 5 on the basis of, for example, the target traveling state, the determination result of the power deficiency determination unit 55, the accelerator operation amount input via the CAN 56, and the like. The target computing unit 54*b* controls the braking/driving force control unit 54*c* on the basis of the determination result of the on/off state of the engine 5. The target computing unit 54*b* controls the HMI device 4 and the braking/driving force control unit 54*c* on the basis of the target traveling state quantity.

An example of the schematic configuration of the target computing unit 54*b* will be described with reference to the block diagram of FIG. 3. As shown in FIG. 3, the target computing unit 54*b* includes an accelerator off guiding HMI determination unit 60, an engine brake increase determination unit 62, an engine early off determination unit 64, a driver model calculation unit 66 and an engine on/off determination unit 68.

The accelerator off guiding HMI determination unit 60 computes the timing at which accelerator off operation is guided and assisted by the HMI device 4 on the basis of the target traveling state quantity, controls the HMI device 4 accordingly, and outputs driving assistance information.

The engine brake increase determination unit 62 calculates the magnitude of engine brake generated on the basis of the target traveling state quantity. That is, the engine brake increase determination unit 62 calculates the magnitude of engine brake, required to decelerate to a speed at which brake on operation is carried out at the predetermined point after accelerator off operation is carried out, on the basis of the target traveling state quantity. The engine brake increase determination unit 62 calculates the number of times of engine brake regeneration by the MG 6 and a time interval of engine brake regeneration in addition to ordinary engine brake, and the like, on the basis of the calculated magnitude of engine brake. The engine brake increase determination unit 62 transmits the calculated result to the driver model calculation unit 66.

The engine early off determination unit 64 determines whether to carry out setting such that the output of the engine 5 is allowed to be early set to the off state, on the basis of the target traveling state quantity and the vehicle speed. That is, the engine early off determination unit 64 determines whether to switch the criteria of determination of the on/off state of the engine 5 in the engine on/off determination unit 68 to criteria at which it is easily determined to set the engine 5 to the off state. When the engine early off determination unit 64 determines that it has reached the position from which it is possible to reach the target stopping position even when traveling in a state where the engine 5 is set in the off state, the engine early off determination unit 64 outputs an engine early off request to the engine on/off determination unit 68. The engine early off request is a request to switch into criteria at which it is easily determined to set the engine 5 to the off state. When the engine early off determination unit 64 determines that electric power is deficient on the basis of the determination result of the power deficiency determination unit 55, the engine early off determination unit 64 stops outputting the engine early off request.

The driver model calculation unit 66 calculates a driver requesting power on the basis of the vehicle speed and the accelerator operation amount that are acquired via the CAN 56 and the calculated result output from the engine brake increase determination unit 62. The driver model calculation unit 66 calculates a target driving state on the basis of the calculated result of the engine brake increase determination unit 62, and detects an actual driving state via the CAN 56. The driver model calculation unit 66 outputs information about the output of the engine 5, calculated on the basis of a difference between the target driving state and the actual driving state, to the engine on/off determination unit 68 as the driver requesting power. Here, the driver model calculation unit 66 according to the present embodiment outputs a condition required to bring the driving state close to the driving state based on the accelerator operation amount, as the driver requesting power. Therefore, in the driver model calculation unit 66, the accelerator operation amount and the driver requesting power are substantially equivalent to each other. The driver model calculation unit 66 may set the condition required to bring the driving state to the target driving state, as the driver requesting power.

The engine on/off determination unit 68 determines the driving state of the engine 5 on the basis of the engine early off request, output from the engine early off determination unit 64, and the driver requesting power. The engine on/off determination unit 68 determines whether the engine 5 is set to the on state or the off state on the basis of the determination result. The engine on/off determination unit 68 outputs the determination result to the braking/driving force control unit 54*c*. When the engine on/off determination unit 68 determines that the engine 5 is in the on state and the driver requesting power is lower than the engine off threshold, the engine on/off determination unit 68 switches the engine 5 from the on state to the off state. When the engine on/off determination unit 68 determines that the engine 5 is in the off state and the driver requesting power is higher than the engine on threshold, the engine on/off determination unit 68 switches the engine 5 from the off state to the on state.

When a signal for setting the engine 5 to the on state is output from the engine on/off determination unit 68 in a state where the engine 5 is set in the off state, the braking/driving force control unit 54*c* sets the engine 5 to the on state, that is, the braking/driving force control unit 54*c* starts the engine 5. When a signal for setting the engine 5 to the off state is output from the engine on/off determination unit 68 in a state where the engine 5 is set in the on state, the braking/driving force control unit 54*c* sets the engine 5 to the off state, that is, the braking/driving force control unit 54*c* stops the engine 5.

When driver's accelerator off operation is actually carried out, the braking/driving force control unit 54*c* executes braking/driving force control, and adjusts the actual deceleration of the vehicle 2 such that the actual deceleration becomes a prescribed accelerator off deceleration. Specifically, the braking/driving force control unit 54c controls the deceleration generated by engine brake on the basis of control of the target computing unit 54b. Because the vehicle control system 3 is a hybrid system, the braking/driving force control unit 54c executes regenerative engine brake increasing control for carrying out engine brake regeneration with the use of the MG 6 in addition to ordinary engine brake, and the like, such that the deceleration becomes the prescribed accelerator off deceleration. The engine brake regeneration through regenerative engine brake increasing control receives smaller influence, or the like, of the amount of heat generated during regeneration as compared to brake regeneration based on the above-described driver's brake on operation, so a regeneration efficiency relatively tends to increase. Thus, the vehicle control system 3 is able to ensure a period during which the regenerative engine brake increasing control is executed for a relatively long period of time by guiding and assisting driver's accelerator off operation at appropriate timing with the use of the driving assistance apparatus 1, so it is possible to expect an advantageous effect of further higher improvement in fuel economy.

The power deficiency determination unit 55 determines a state of electric power of the vehicle 2 on the basis of information about the SOC (state of charge) of the battery 9' and a current power consumption, acquired via the CAN 56, or the like. When the power deficiency determination unit 55 determines that electric power is deficient, the power deficiency determination unit 55 prohibits output of the engine early off request from the engine early off determination unit 64. That is, when electric power is deficient, the power deficiency determination unit 55 carries out setting such that no engine early off request is allowed to be output even when the other condition satisfies the condition for outputting the engine early off request. Specifically, when the SOC is lower than a set threshold, the power deficiency determination unit 55 prohibits output of the engine early off request from the engine early off determination unit 64.

Figure 4:
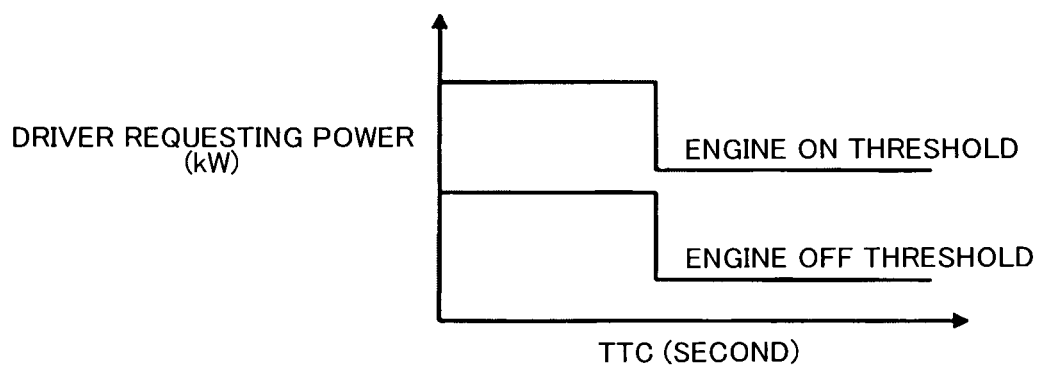
FIG. 4 is a graph that shows an example of an engine on threshold and an engine off threshold.
Figure 5A:
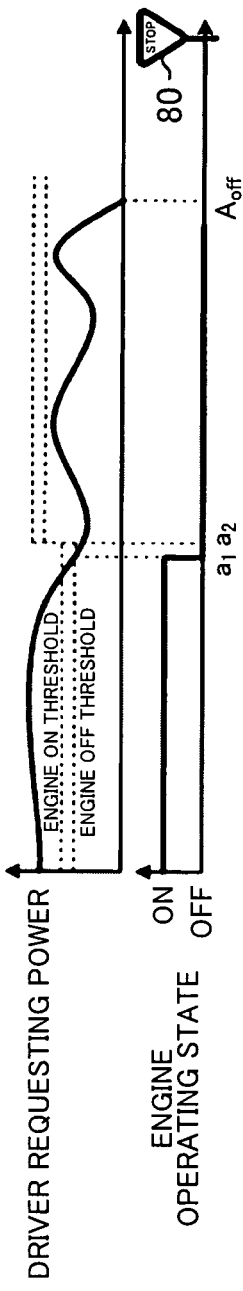
FIG. 5A is a schematic view that shows an example of the correlation among a residual distance to a stopping position, a driver requesting power and an engine operating state in the vehicle control system.
Figure 5B:
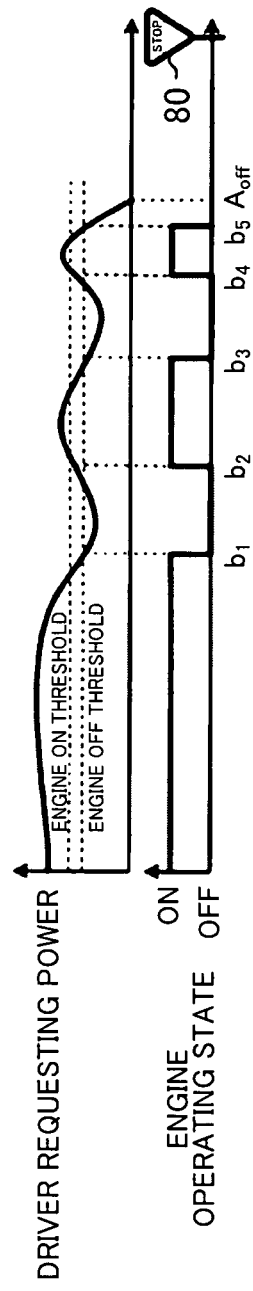
FIG. 5B is a schematic view that shows a reference example of the correlation among a residual distance to the stopping position, a driver requesting power and an engine operating state in the vehicle control system.
Figure 5C:
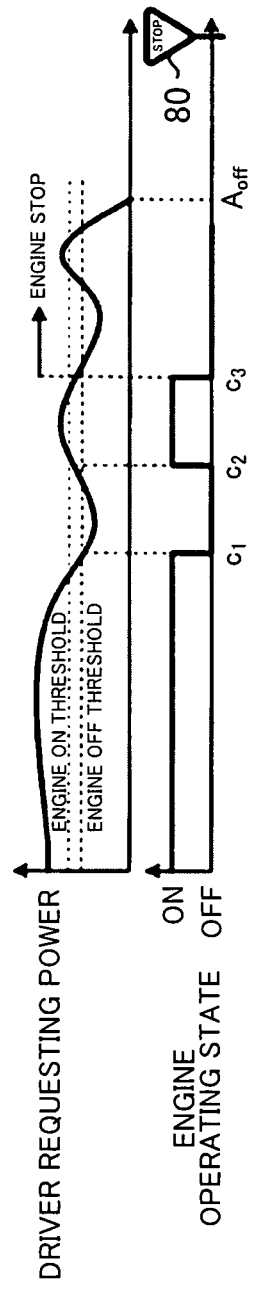
FIG. 5C is a schematic view that shows a reference example of the correlation among a residual distance to the stopping position, a driver requesting power and an engine operating state in the vehicle control system.

Next, an example of the process that is executed by the driving assistance apparatus 1 according to the present embodiment will be described with reference to FIG. 4 to FIG. 6. FIG. 4 is a graph that shows an example of the engine on threshold and the engine off threshold. FIG. 5A is a schematic view that shows an example of the correlation among a residual distance to a stopping position, a driver requesting power and an engine operating state in the vehicle control system. FIG. 5B is a schematic view that shows a reference example of the correlation among a residual distance to the stopping position, a driver requesting power and an engine operating state in the vehicle control system. FIG. 5C is a schematic view that shows a reference example of the correlation among a residual distance to the stopping position, a driver requesting power and an engine operating state in the vehicle control system. FIG. 6A is a schematic view that shows an example of the correlation among a residual distance to a stopping position, a driver requesting power and an engine operating state in the vehicle control system. FIG. 6B is a schematic view that shows a reference example of the correlation among a residual distance to the stopping position, a driver requesting power and an engine operating state in the vehicle control system. FIG. 6C is a schematic view that shows a reference example of the correlation among a residual distance to the stopping position, a driver requesting power and an engine operating state in the vehicle control system.

The driving assistance apparatus 1 changes criteria for determining whether the engine on/off determination unit 68 switches between the on/off state of the engine 5, on the basis of whether the engine early off request is output from the engine early off determination unit 64 of the target computing unit 54b. The engine early off determination unit 64 according to the present embodiment calculates a time TTC that is taken to stop or decelerate on the basis of the residual distance included in the target traveling state and the current vehicle speed acquired via the CAN 56. Here, in the present embodiment, calculation is made by using Time TTC=(Residual Distance)/(Current Vehicle Speed). In the present embodiment, (Residual Distance)/(Current Vehicle Speed) is defined as the time TTC; however, the time TTC is not limited to this configuration. The time TTC may be calculated in consideration of a brake deceleration and a deceleration through coasting. Here, coasting is a state where the vehicle is traveling while driving force is not applied by setting a shift range to neutral, or the like, and no braking force, such as engine brake and disk brake, is applied. Alternatively, TTC may be obtained as not a function of a time but a parameter. When the time TTC is longer than or equal to a threshold, the engine early off determination unit 64 determines that it has reached a position at which it is possible to reach the target stopping position even when traveling in a state where the engine 5 is set in the off state, that is, even when traveling in coasting, outputs the engine early off request to the engine on/off determination unit 68. When the time TTC is shorter than the threshold, the engine early off determination unit 64 does not output the engine early off request to the engine on/off determination unit 68.

The engine on/off determination unit 68 determines whether the engine 5 is set in the on state or the off state on the basis of the correlation between the driver requesting power, output from the driver model calculation unit 66, and the set threshold. The engine on/off determination unit 68 has set the engine off threshold for switching the engine 5 from the on state to the off state and the engine on threshold for switching the engine 5 from the off state to the on state. When the engine 5 is in the on state and the driver requesting power becomes lower than the engine off threshold, the engine on/off determination unit 68 sets the engine 5 to the off state. When the engine 5 is in the off state and the driver requesting power becomes higher than the engine on threshold, the engine on/off determination unit 68 sets the engine 5 to the on state.

The engine on/off determination unit 68 changes the values of the engine off threshold and engine on threshold on the basis of whether there is an engine early off request. Specifically, the engine on/off determination unit 68 increases the values of the engine off threshold and engine on threshold when there is an engine early off request as compared to when there is no engine early off request.

As described above, in the driving assistance apparatus 1, the engine early off determination unit 64 outputs the engine early off request when the engine early off determination unit 64 determines that the time TTC is longer than or equal to the threshold, and the engine on/off determination unit 68 changes the values of the engine off threshold and engine on threshold (the value of engine required power (kW)) on the basis of whether there is an engine early off request. Thus, in the driving assistance apparatus 1, the correlation among the time TTC, the engine off threshold and the engine on threshold becomes the correlation shown in FIG. 4. That is, in the driving assistance apparatus 1, the values of the engine off threshold and engine on threshold (the value of engine required power (kW)) decrease when the time TTC is longer than or equal to the threshold, that is, a time longer than the threshold, and the values of the engine off threshold and engine on threshold increase when the time TTC is shorter than the threshold, that is, a time shorter than the threshold.

The driving assistance apparatus 1 controls the on/off state of the engine 5, by changing the engine off threshold and the engine on threshold on the basis of the correlation shown in FIG. 4. Thus, when stopping at a target stopping position, it is possible to suppress frequent switching between the on/off states of the engine 5, and it is possible to further early set the engine 5 to the off (stopped) state. The driving assistance apparatus 1 is able to set the engine 5 to the on state when the accelerator requesting power exceeds the engine on threshold even immediately before the target stopping position, so it is possible to appropriately drive the engine 5 when the power of the engine 5 is required.

Hereinafter, the correlation between the driver requesting power and the on/off state of the engine 5 until stopping at the target stopping position will be described with reference to FIG. 5A to FIG. 5C. Here, FIG. 5A to FIG. 5C respectively show the cases where a change in the driver requesting power is the same and a condition for switching between the on/off states of the engine 5 is changed. FIG. 5A shows the case where the on/off states of the engine are switched with the use of the driving assistance apparatus 1 according to the present embodiment. FIG. 5B shows the case where the engine off threshold and the engine on threshold are not changed. FIG. 5C shows the case where the engine off threshold and the engine on threshold are not changed and the engine is set to the off state when the distance to the target stopping position becomes shorter than or equal to a predetermined distance.

In FIG. 5A to FIG. 5C, a "STOP" sign 80 is arranged, and the position at which the vehicle temporarily stops is set for the target stopping position. The accelerator requesting power changes in a repetition of increase and decrease, and the accelerator requesting power becomes 0 at a point Aoff. That is, in FIG. 5A to FIG. 5C, the accelerator enters a non-depressed state at the point Aoff, and the accelerator operation amount becomes 0. Although not shown in the drawings, the accelerator of the vehicle 2 is set to the off state at the point Aoff and the brake is set to the on state, that is, the brake pedal is depressed. Thus, the vehicle 2 decelerates at a brake deceleration, and stops at the target stopping position at which the sign 80 is arranged.

The driving assistance apparatus 1 executes control with the above-described criteria. Thus, as shown in FIG. 5A, traveling is carried out in a state where the engine 5 is set in the on state, and the engine 5 is set to the off state when the driver requesting power becomes lower than or equal to the engine off threshold at a point $a_1$. After that, the driving assistance apparatus 1 detects that TTC becomes shorter than the threshold at a point $a_2$, and changes the engine off threshold and the engine on threshold to higher values. In the driving assistance apparatus 1, traveling is carried out to the target stopping position in a state where the engine 5 is set in the off state because the driver requesting power does not exceed the engine on threshold after passage of the point $a_2$.

Next, in the case of control shown in FIG. 5B, the vehicle travels in a state where the engine 5 is set in the on state, and, when the driver requesting power becomes lower than or equal to the engine off threshold at a point $b_1$ that is the same position as the point $a_1$, the engine 5 is set to the off state. After that, the vehicle travels in a state where the engine 5 is set in the off state, and, when the driver requesting power exceeds the engine on threshold at a point $b_2$, the engine 5 is set to the on state. After that, the vehicle travels in a state where the engine 5 is set in the on state, and, when the driver requesting power becomes lower than or equal to the engine off threshold at a point $b_3$, the engine 5 is set to the off state. After that, the vehicle travels in a state where the engine 5 is set in the off state, and, when the driver requesting power exceeds the engine on threshold at a point $b_4$, the engine 5 is set to the on state. After that, the vehicle travels in a state where the engine 5 is set in the on state, and, when the driver requesting power becomes lower than or equal to the engine off threshold at a point $b_2$, the engine 5 is set to the off state. In this way, in the case of control shown in FIG. 5B, the engine is set to the on/off state with the same criteria in correspondence with the driver requesting power even when the vehicle stops at the target stopping position, so the engine 5 is repeatedly set to the on/off states.

Next, in the case of control shown in FIG. 5C, the vehicle travels in a state where the engine 5 is set in the on state, and, when the driver requesting power becomes lower than or equal to the engine off threshold at a point $c_1$ that is the same position as the point $a_1$ and the point $b_1$, the engine 5 is set to the off state. After that, the vehicle travels in a state where the engine 5 is set in the off state, and, when the driver requesting power exceeds the engine on threshold at a point $c_2$ that is the same as the point $b_2$, the engine 5 is set to the on state. After that, the vehicle sets the engine 5 to the off state at a point $c_3$ a predetermined distance away from the target stopping position. In the case of control shown in FIG. 5C, after the vehicle passes through the point $c_3$, the engine 5 is not set to the on state irrespective of the magnitude of the driver requesting power.

Next, another example of the correlation between the driver requesting power and the on/off state of the engine 5 until stopping at a target stopping position will be described with reference to FIG. 6A to FIG. 6C. Here, FIG. 6A to FIG. 6C, as well as FIG. 5A to FIG. 5C, respectively show the cases where a change in the driver requesting power is the same and a condition for switching between the on/off states of the engine 5 is changed. FIG. 6A shows the case where the on/off states of the engine are switched with the use of the driving assistance apparatus 1 according to the present embodiment. FIG. 6B shows the case where the engine off threshold and the engine on threshold are not changed. FIG. 6C shows the case where the engine is set to the off state when the engine off threshold and the engine on threshold are not changed and the distance to the target stopping position becomes shorter than or equal to a predetermined distance.

In FIG. 6A to FIG. 6C, a "STOP" sign 82 is arranged, and the position at which the vehicle temporarily stops is set for the target stopping position. In addition, in FIG. 6A to FIG. 6C, a traveling road in a set range from the point at which the "STOP" sign 82 is arranged is an uphill 84. Therefore, the vehicle climbs the uphill 84 at a constant driving force to near the target stopping position, so the accelerator requesting power changes in a high value range, and the accelerator requesting power becomes 0 at the point Aoff near the sign 82.

The driving assistance apparatus 1 executes control with the above-described criteria. Thus, as shown in FIG. 6A, traveling is carried out in a state where the engine 5 is set in the on state, and, when it is detected that TTC becomes shorter than the threshold at a point $d_1$, the engine off threshold and the engine on threshold are changed to higher values. In the driving assistance apparatus 1, the driver requesting power does not cross the engine threshold before and after passage of the point $d_1$, so traveling is carried out in a state where the engine 5 is set in the on state. The driving assistance apparatus 1 sets the engine 5 to the off state when the driver requesting power becomes lower than or equal to the engine off threshold at a point $d_2$ near the point Aoff, and traveling is carried out to the target stopping position in a state where the engine 5 is set in the off state.

Next, in the case of control shown in FIG. 6B, the vehicle travels in a state where the engine 5 is set in the on state, and, when the driver requesting power becomes lower than or equal to the engine off threshold at a point $e_1$ near the point Aoff, the engine 5 is set to the off state. The point $e_1$ is a position closer to the point Aoff than the point $d_2$.

Next, in the case of control shown in FIG. 6C, the vehicle sets the engine 5 to the off state at a point $f_1$ a predetermined distance away from the target stopping position. In the case of control shown in FIG. 6C, after the vehicle passes through the point $f_1$, the engine 5 is not set to the on state irrespective of the magnitude of the driver requesting power. The point $f_1$ is the same position as the point $c_3$, and is a position farther from the point Aoff than the point $d_2$. In the case of control shown in FIG. 6C, because the engine 5 is set in the off state within a set distance from the target stopping position even while traveling on the uphill 84, the vehicle travels to the target stopping position on only the power of the MG 6. Therefore, the electric power of the battery 9 is significantly consumed. Depending on the remaining level of the battery 9, the vehicle cannot climb the uphill 84 to the top, and may not be able to reach the target stopping position.

As shown in FIG. 5A to FIG. 5C and FIG. 6A to FIG. 6C, when the driving assistance apparatus 1 determines on the basis of TTC that it has reached a position at which it is possible to reach the target stopping position even when traveling in a state where the engine 5 is set in the off state, that is, it has got closer to the target stopping position than the position at which it is possible to reach the target stopping position even when traveling in a state where the engine 5 is set in the off state, the driving assistance apparatus 1 changes the engine off threshold and the engine on threshold to higher values. Thus, at the time of driving for stopping at a target position, it is possible to reduce the frequency at which the engine 5 is switched between the on/off states. Thus, it is possible to improve fuel economy.

The driving assistance apparatus 1 changes the engine off threshold and the engine on threshold at the position at which it is possible to reach the target stopping position even when traveling in a state where the engine 5 is set in the off state, that is, even when traveling in coasting, and, when the engine required power becomes the engine off threshold at a position closer to the target stopping position than that position, the driving assistance apparatus 1 sets the engine 5 to the off state. Thus, it is possible to set the condition that the engine 5 is easily set to the off state at a position suitable for a condition during traveling. Thus, as shown in FIG. 5C and FIG. 6C, it is possible to set the engine 5 to the off state at a more appropriate position than the case where the engine 5 is set to the off state a predetermined distance before the target stopping position. In the driving assistance apparatus 1, because the engine off threshold and the engine on threshold are changed at the position at which it is possible to reach the target stopping position even when traveling in a state where the engine 5 is set in the off state, it is basically possible to reach the target stopping position even when the engine is set to the off state after the thresholds are changed. Therefore, the driving assistance apparatus 1 is able to set the engine 5 in the off state over a longer distance for a longer time in a range in which it is basically possible to reach the target stopping position even when not being accelerated with driving force applied from the engine 5 and the MG 6.

The driving assistance apparatus 1 changes the engine off threshold and the engine on threshold. Thus, as shown in FIG. 6A to FIG. 6C, the engine 5 is set to the on state when it is required to travel on a predetermined driving force, like the uphill 84, even near the target stopping position. Therefore, the driving assistance apparatus 1 is able to appropriately carry out traveling to the target stopping position.

Figure 7:
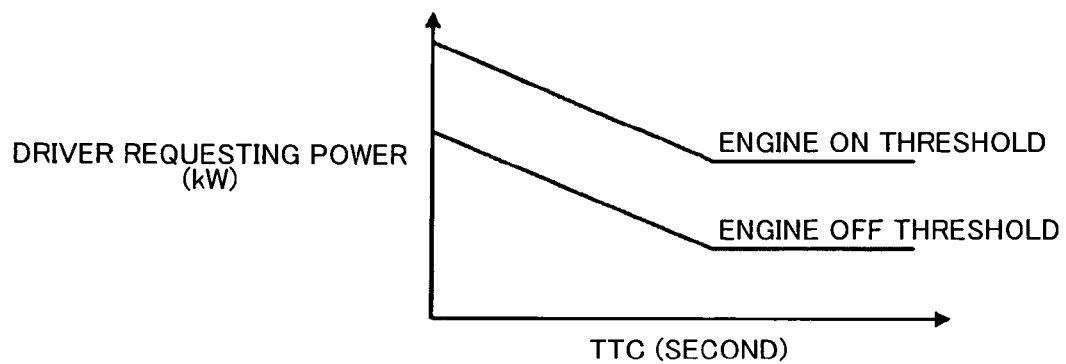
FIG. 7 is a graph that shows another example of the engine on threshold and the engine off threshold.

The driving assistance apparatus 1 according to the present embodiment changes the engine on threshold and the engine off threshold between two-step values with reference to the threshold of TTC; however, the driving assistance apparatus 1 is not limited to this configuration. Here, FIG. 7 is a graph that shows another example of the engine on threshold and the engine off threshold. As shown in FIG. 7, the driving assistance apparatus 1 may linearly change the values of the engine on threshold and engine off threshold (the value of engine required power (kW)) in the range in which TTC is shorter than the threshold. Specifically, the driving assistance apparatus 1 may linearly change the engine on threshold and the engine off threshold such that the engine on threshold and the engine off threshold increase as TTC reduces in the range in which TTC is shorter than the threshold. The driving assistance apparatus 1 linearly changes the engine on threshold and the engine off threshold. Thus, it is possible to set such that the engine 5 is more easily set to the off state and is difficult to be set to the on state as TTC reduces.

The driving assistance apparatus 1 according to the present embodiment determines that, when TTC is shorter than the threshold, it has reached the position at which it is possible to reach the target stopping position even when traveling in a state where the engine 5 is set in the off state, and changes the engine off threshold and the engine on threshold to higher values, thus making the setting such that the engine 5 is easily set to the off state and is difficult to be set to the on state. However, the threshold for changing the engine off threshold and the engine on threshold to higher values is not limited to TTC. The driving assistance apparatus 1 according to the present embodiment may carry out determination on the basis of a residual distance to the target stopping position. For example, the driving assistance apparatus 1 according to the present embodiment may change the engine off threshold and the engine on threshold to higher values when the residual distance to the target stopping position becomes shorter than the threshold. The driving assistance apparatus 1 is able to use various criteria as long as the criteria allow determination that it has reached the position at which it is possible to reach the target stopping position even when traveling in a state where the engine 5 is set in the off state.

The driving assistance apparatus 1 according to the present embodiment sets the engine off threshold for switching the engine 5 from the on state to the off state and the engine on threshold for switching the engine 5 from the off state to the on state, to different values, specifically, sets the engine on threshold such that the engine on threshold is higher than the engine off threshold. Thus, it is possible to allow the engine 5 to be set to the on state again when a higher engine required power is detected. The driving assistance apparatus 1 according to the present embodiment may set the engine off threshold and the engine on threshold to the same value.

The driving assistance apparatus 1 may determine the position at which it is possible to reach the target stopping position even when traveling in a state where the engine 5 is set in the off state, in consideration of deceleration through brake. Thus, the driving assistance apparatus 1 is able to detect a non-accelerating section under the condition closer to actual travel at the time of stopping at the target stopping position, and is able to set the starting point of the non-accelerating section to the position at which it is possible to reach the target stopping position even when traveling in a state where the engine 5 is set in the off state. Thus, it is possible to establish a state where the engine 5 is easily set to the off state in the non-accelerating section.

Figure 8:
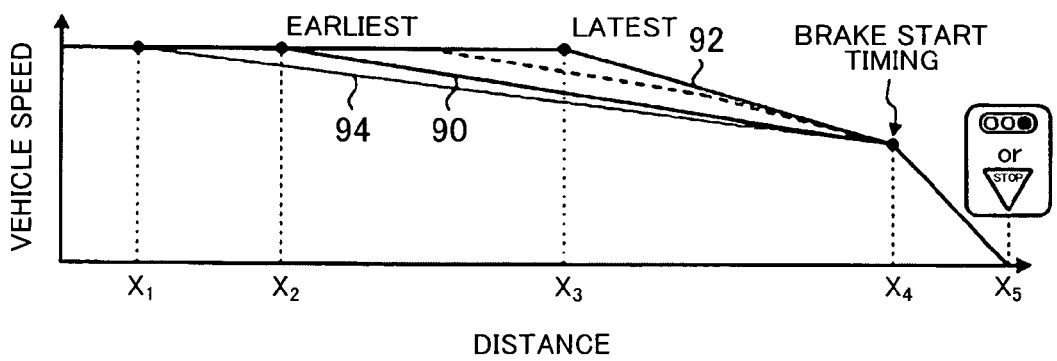
FIG. 8 is a schematic view that shows the correlation between a residual distance to a stopping position and a vehicle speed.

FIG. 8 is a schematic view that shows the correlation between a residual distance to a stopping position and a vehicle speed. As shown in FIG. 8, when the vehicle detects that the vehicle reaches a point at which a traffic light indicating red or a temporary stop sign is present, the vehicle detects a point $X_5$ at which a stop line corresponding to the traffic light or sign is arranged as the target stopping position. After that, as indicated by deceleration patterns 90, 92 in FIG. 8, the driving assistance apparatus 1 calculates a deceleration pattern in which it is possible to stop at the point $X_5$, and determines brake start timing for achieving the deceleration pattern 90 or deceleration pattern 92. In the present embodiment, a point $X_4$ is detected as the position of the brake start timing.

The deceleration patterns 90, 92 are deceleration patterns calculated on the assumption that the vehicle decelerates by using engine brake at the time of decelerating to a predetermined speed at the brake start timing. The deceleration pattern 90 is a deceleration pattern in the case of decelerating at an accelerator off deceleration at the time when a so-called drive range is selected as a shift range. The deceleration pattern 92 corresponds to an accelerator off deceleration at the time when a so-called brake range is selected as the shift range, and has a relatively higher deceleration in absolute value than the deceleration pattern 90. When the driving assistance apparatus 1 carries out deceleration by using engine brake, the deceleration pattern 90 provides the earliest timing, that is, the accelerator off timing at the nearest position. In the present embodiment, a point $X_2$ is detected as the accelerator off timing of the deceleration pattern 90. When the driving assistance apparatus 1 carries out deceleration by using engine brake, the deceleration pattern 92 provides the latest timing, that is, the accelerator off timing at the farthest position. In the present embodiment, a point $X_3$ is detected as the position of the accelerator off timing of the deceleration pattern 92. The driving assistance apparatus 1 adjusts the deceleration after the accelerator is off and before the brake start timing within the range between the deceleration of the deceleration pattern 90 and the deceleration of the deceleration pattern 92 on the basis of the timing of driver's actual off accelerator off operation. Thus, the driving assistance apparatus 1 carries out deceleration to the predetermined speed at the brake start timing. The driving assistance apparatus 1 also uses the regenerative brake of the MG 6 as engine brake.

The driving assistance apparatus 1 calculates a deceleration pattern 94 in which it is possible to reach the point $X_4$ at the speed of the brake start timing by traveling in coasting with reference to the calculated brake start timing, that is, traveling without generating engine brake by setting the shift range to neutral, or the like, on the basis of the calculated deceleration pattern 90, 92, or the like, and sets the point $X_1$ of the deceleration pattern 94 to the position at which it is possible to reach the target stopping position even when traveling in a state where the engine 5 is set in the off state. In the present embodiment, the point $X_1$ is detected as the position at which it is possible to reach the target stopping position even when traveling in a state where the engine 5 is set in the off state (even when traveling in coasting). The driving assistance apparatus 1 calculates the position at which the engine on threshold and the engine off threshold are set to higher values with reference to the position at which it is possible to reach the target stopping position even when traveling in coasting. In the present embodiment, the point $X_1$ is regarded as the position at which the engine on threshold and the engine off threshold are set to higher values.

The driving assistance apparatus 1 increases the engine on threshold and the engine off threshold when passing through the point $X_1$. Thus, the driving assistance apparatus 1 is able to establish the state where the engine 5 is easily set to the off state while keeping the state where it is possible to reach at the predetermined speed at the brake start timing even when traveling in coasting. Thus, it is possible to improve the fuel economy of the vehicle 2. The driving assistance apparatus 1 is able to decelerate the vehicle that travels toward the target stopping position while suppressing a feeling of strangeness experienced by the driver.

Here, the driving assistance apparatus 1 preferably assists the driver in driving on the basis of the calculated deceleration pattern 90, 92, or the like. The driving assistance apparatus 1 calculates the timing at which various purposes are allowed to be achieved at high level as an accelerator off guiding point. The various purposes include the fact that it is possible to appropriately stop at a target stop point, the fact that it is possible to achieve braking with an appropriate braking distance at an appropriate deceleration, the fact that it is possible to generate electric power through engine brake regeneration, and the like. Specifically, as shown in FIG. 8, the driving assistance apparatus 1 sets the point $X_2$ as the accelerator off guiding point. The driving assistance apparatus 1 sets the brake start timing as a brake on guiding point. The driving assistance apparatus 1 may calculate the deceleration patterns 90, 92, the accelerator off guiding point and the brake on guiding point as a target traveling state quantity or may calculate the accelerator off guiding point and the brake on guiding point as a target traveling state quantity.

When the driving assistance apparatus 1 determines that the current position and the current vehicle speed correspond to the calculated accelerator off guiding point or the brake on guiding point, the driving assistance apparatus 1 causes the HMI device 4 to display an image corresponding to the operation. The accelerator off guiding point and brake on guiding point of the driving assistance apparatus 1 may be set to an accelerator off guiding point and a brake on guiding point a predetermined time before desired timing of the start of operation in consideration of a time that is taken from when the image is displayed to when the operation is carried out. In this way, the driving assistance apparatus 1 is able to assist stopping operation by outputting driving assistance information on the basis of the target traveling state quantity, such as the calculated deceleration pattern, accelerator off guiding point, brake on guiding point, and the like. The assistance of stopping operation includes the fact that it is possible to decelerate the vehicle 2 in a pattern along with the deceleration pattern, the fact that it is possible to appropriately stop at the target stop point, the fact that it is possible to achieve braking with an appropriate braking distance at an appropriate deceleration and the fact that it is possible to generate electric power through engine brake regeneration.

As shown in FIG. 8, the driving assistance apparatus 1 calculates multiple decelerations that are allowed to be achieved in an accelerator off state from the decelerations of the plurality of engine brakes, calculates multiple sets of the deceleration patterns 90, 92, and calculates the deceleration pattern of which the accelerator off timing is the earliest and the deceleration pattern of which the accelerator off timing is the latest. Thus, it is possible to set the accelerator off section, in which it is possible to reach the predetermined speed at the brake start timing, to a set range. Thus, it is possible to provide a certain allowance for a time during which the driver carries out accelerator off operation, so the driver is allowed to stop at the target stopping position at an appropriate deceleration through operation with allowance.

Figure 9:
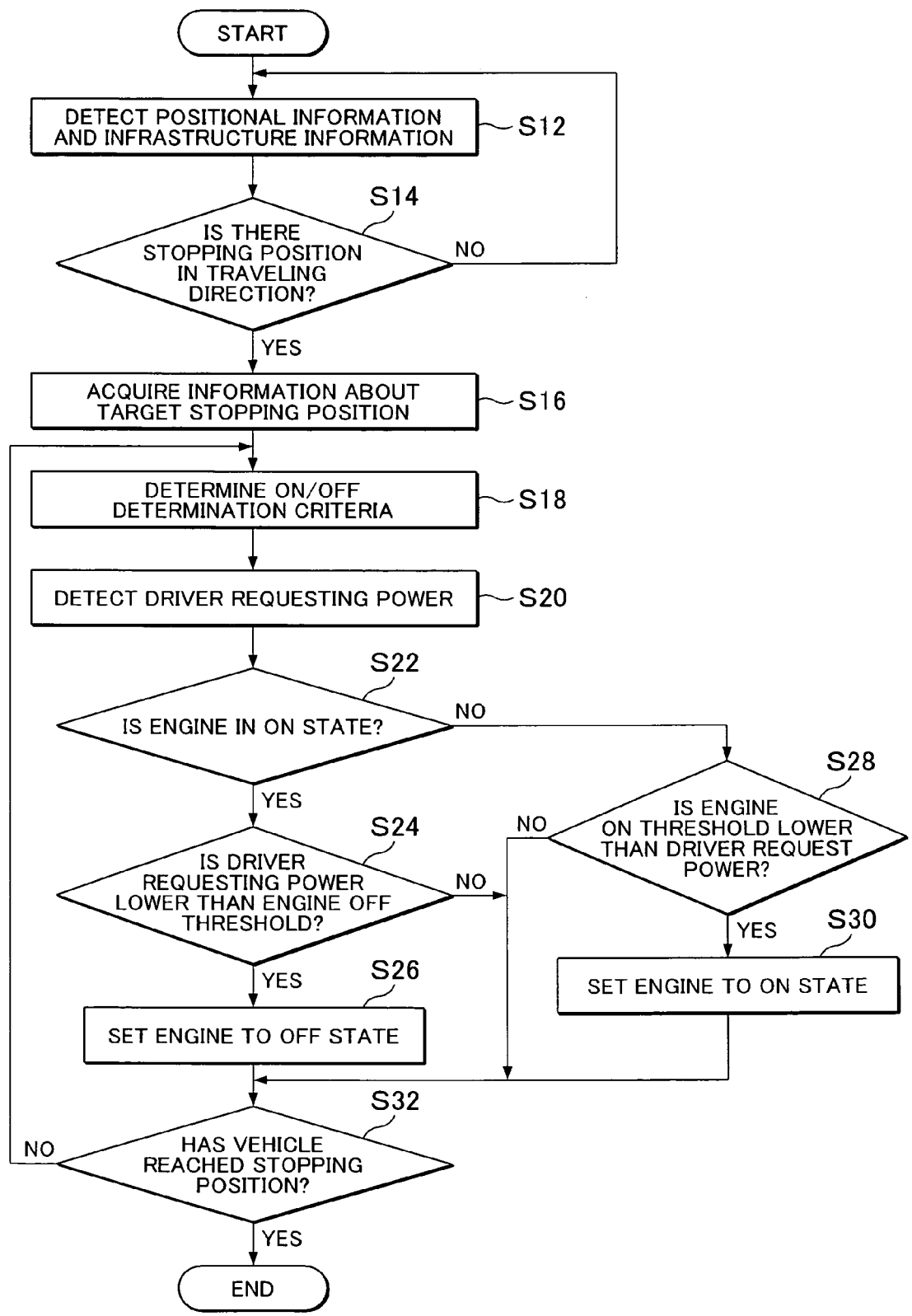
FIG. 9 is a flowchart that shows an example of control that is executed by the ECU.
Figure 10:
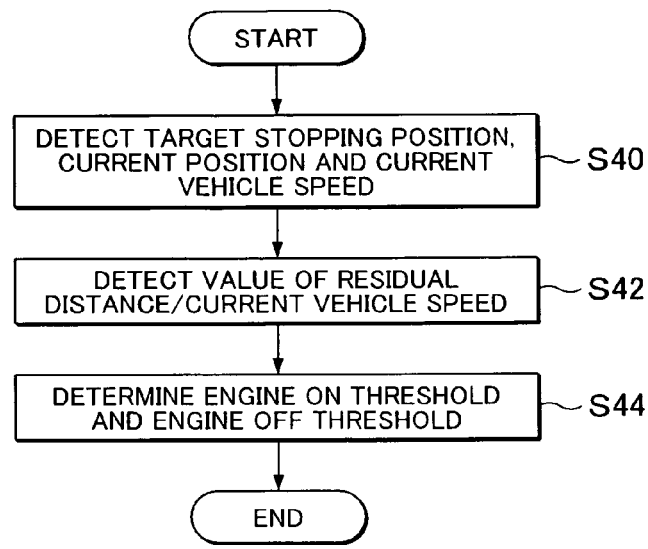
FIG. 10 is a flowchart that shows an example of control that is executed by the ECU.

Hereinafter, control that is executed in the driving assistance apparatus 1 will be described with reference to FIG. 9 and FIG. 10. FIG. 9 and FIG. 10 are flowcharts that show examples of controls that are executed by the ECU. The driving assistance apparatus 1 is able to execute controls shown in FIG. 9 and FIG. 10 as follows. The ECU 50 executes arithmetic processing on the basis of the results detected at various portions. The driving assistance apparatus 1 detects positional information and infrastructure information in step S12, and determines in step S14 whether there is a stopping position in the traveling direction. The driving assistance apparatus 1 detects whether there is a traffic light or an intersection in the traveling direction on the basis of the positional information, and detects a light cycle, and the like, of the intended traffic light on the basis of the infrastructure information. The driving assistance apparatus 1 determines that there is a stopping position, in the traveling direction when there is a traffic light showing unpassable indication, such as red light, at the time of arrival or an intersection that requires a temporary stop in the traveling direction.

When the driving assistance apparatus 1 determines in step S14 that there is no stopping position (No), the process returns to step S12. The driving assistance apparatus 1 repeats the processes of step S12 and step S14 until a stopping position is detected. When the driving assistance apparatus 1 determines in step S14 that there is a stopping position (Yes), the process proceeds to step S16, and the driving assistance apparatus 1 acquires information about the target stopping position. The driving assistance apparatus 1 acquires the positional information, or the like, of the stopping position detected in step S14 as the information about the target stopping position.

When the driving assistance apparatus 1 acquires the information about the target stopping position in step S16, the driving assistance apparatus 1 determines on/off determination criteria in step S18. That is, the criterion for setting the engine 5 to the on state and the criterion for setting the engine 5 to the off state, that is, the engine on threshold and the engine off threshold, are determined. Specifically, the driving assistance apparatus 1 executes the process shown in FIG. 10.

As shown in FIG. 10, the driving assistance apparatus 1 detects the target stopping position, the current position and the current vehicle speed in step S40, and detects the value of Residual Distance/Current Vehicle Speed in step S42. The driving assistance apparatus 1 calculates the distance between the target stopping position and the current position as the residual distance, and calculates the value of Residual Distance/Current Vehicle Speed, that is, TTC. After the driving assistance apparatus 1 calculates TTC in step S42, the driving assistance apparatus 1 determines the engine on threshold and the engine off threshold in step S44. That is, the driving assistance apparatus 1 determines the engine on threshold and the engine off threshold corresponding to TTC calculated in step S42 by using the preset correlation among TTC, the engine on threshold and the engine off threshold. When the driving assistance apparatus 1 determines the engine on threshold and the engine off threshold, the driving assistance apparatus 1 ends the process shown in FIG. 10.

When the driving assistance apparatus 1 determines the on/off determination criteria, that is, the engine on threshold and the engine off threshold, in step S18, the driving assistance apparatus 1 detects the driver requesting power in step S20. Specifically, the driving assistance apparatus 1 detects the driver requesting power on the basis of the accelerator operation amount, and the like. When the driving assistance apparatus 1 detects the driver requesting power in step S20, the driving assistance apparatus 1 determines in step S22 whether the engine is in the on state.

When the driving assistance apparatus 1 determines in step S22 that the engine is in the on state (Yes), the driving assistance apparatus 1 determines in step S24 whether the driver requesting power is lower than the engine off threshold. When the driving assistance apparatus 1 determines in step S24 that the driver requesting power is not lower than the engine off threshold (No), the process directly proceeds to step S32. When the driving assistance apparatus 1 determines in step S24 that the driver requesting power is lower than the engine off threshold (Yes), the driving assistance apparatus 1 sets the engine to the off state, that is, the driving assistance apparatus 1 switches the engine from the on state to the off state, in step S26, and then the process proceeds to step S32.

When the driving assistance apparatus 1 determines in step S22 that the engine is not in the on state (No), that is, the engine is in the off state, the driving assistance apparatus 1 determines in step S28 whether the engine on threshold is lower than the driver requesting power. When the driving assistance apparatus 1 determines in step S28 that the engine on threshold is not lower than the driver requesting power (No), the process directly proceeds to step S32. When the driving assistance apparatus 1 determines in step S28 that the engine on threshold is lower than the driver requesting power (Yes), the driving assistance apparatus 1 sets the engine to the on state, that is, the driving assistance apparatus 1 switches the engine from the off state to the on state, in step S30, and then the process proceeds to step S32.

When the driving assistance apparatus 1 makes negative determination in step S24 or step S28 or executes the process of step S26 or step S30, the driving assistance apparatus 1 determines in step S32 whether the vehicle has reached the stopping position. When the driving assistance apparatus 1 determines in step S32 that the vehicle has not reached the stopping position (No), the process returns to step S18, and the driving assistance apparatus 1 executes the processes of step S18 to step S32 again. When the driving assistance apparatus 1 determines in step S32 that the vehicle has reached the stopping position (Yes), the driving assistance apparatus 1 ends the process. The driving assistance apparatus 1 may determine that the vehicle has reached the stopping position when the vehicle has reached the target stopping position or may determine that the vehicle has reached the stopping position when the speed of the vehicle becomes a vehicle speed at which it may be assumed that the vehicle has stopped near the target stopping position.

The driving assistance apparatus 1 executes various processes on the basis of the flowcharts shown in FIG. 9 and FIG. 10. Thus, the driving assistance apparatus 1 is able to switch between the on/off states of the engine with the above-described criteria.

Figure 11:
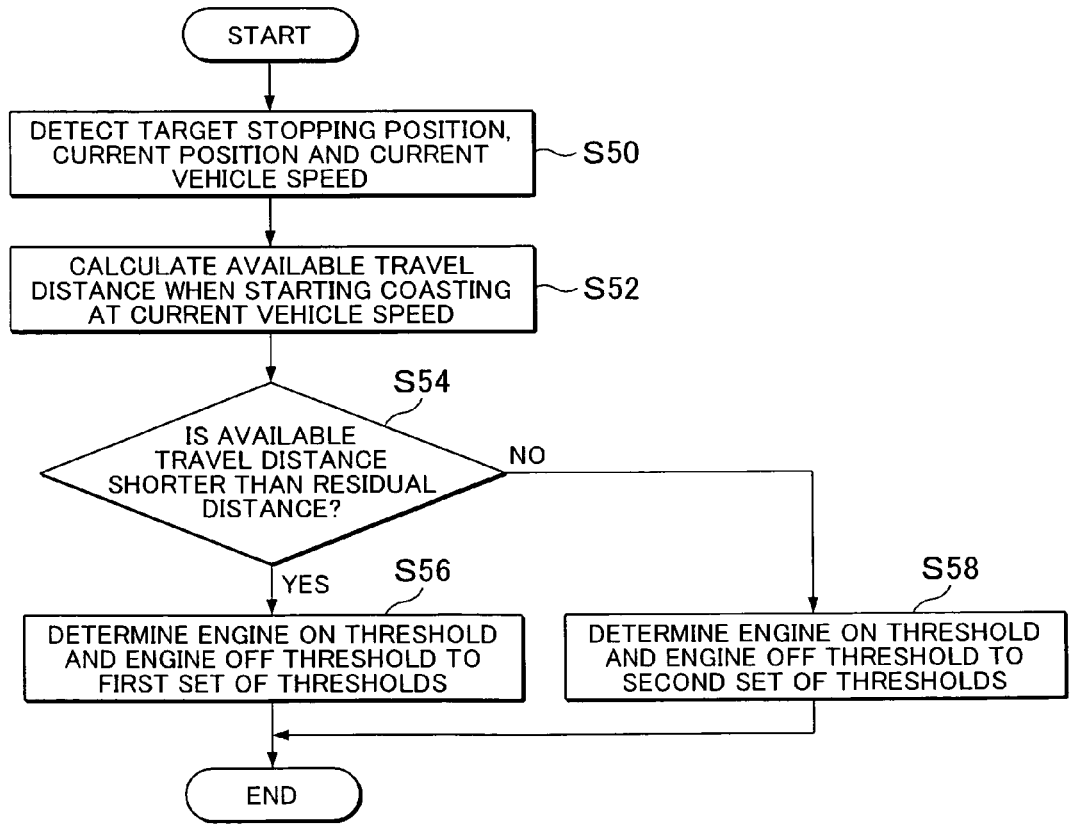
FIG. 11 is a flowchart that shows an example of control that is executed by the ECU.

The driving assistance apparatus 1 may execute the process shown in FIG. 11 as a method of determining the engine on threshold and the engine off threshold in step S18. FIG. 11 is a flowchart that shows an example of control that is executed by the ECU. The driving assistance apparatus 1 detects the target stopping position, the current position and the current vehicle speed in step S50, and calculates an available travel distance when coasting is started at the current vehicle speed in step S52. As shown in the above FIG. 8, the driving assistance apparatus 1 may calculate an available travel distance on the condition that deceleration with brake is started at a predetermined speed.

When the driving assistance apparatus 1 calculates the available travel distance in step S52, the driving assistance apparatus 1 determines in step S54 whether the available travel distance is shorter than the residual distance. The residual distance is a distance between the current position and the target stopping position. When the driving assistance apparatus 1 determines in step S54 that the available travel distance is shorter than the residual distance (Yes), the driving assistance apparatus 1 determines the engine on threshold and the engine off threshold to a first set of thresholds in step S56, and then ends the process. When the driving assistance apparatus 1 determines in step S54 that the available travel distance is shorter than the residual distance (No), the driving assistance apparatus 1 determines the engine on threshold and the engine off threshold to a second set of thresholds in step S58, and then ends the process. Here, the correlation between the first set of thresholds and the second set of thresholds is that the first set of thresholds are higher than the second set of thresholds. That is, the engine on threshold and engine off threshold of the first set of thresholds are thresholds at which the engine is more easily set to the off state than the engine on threshold and engine off threshold of the second set of thresholds.

As shown in FIG. 11, when the driving assistance apparatus 1 calculates an available travel distance in coasting and then determines the thresholds on the basis of the available travel distance of the calculated result and the residual distance as well, similar advantageous effects to the above are obtained. By calculating an available travel distance in computation, it is possible to further accurately calculate an available travel distance in coasting. Thus, even with setting such that the engine is set to the off state earlier, it is possible to appropriately reach the target stopping position.

Figure 12:
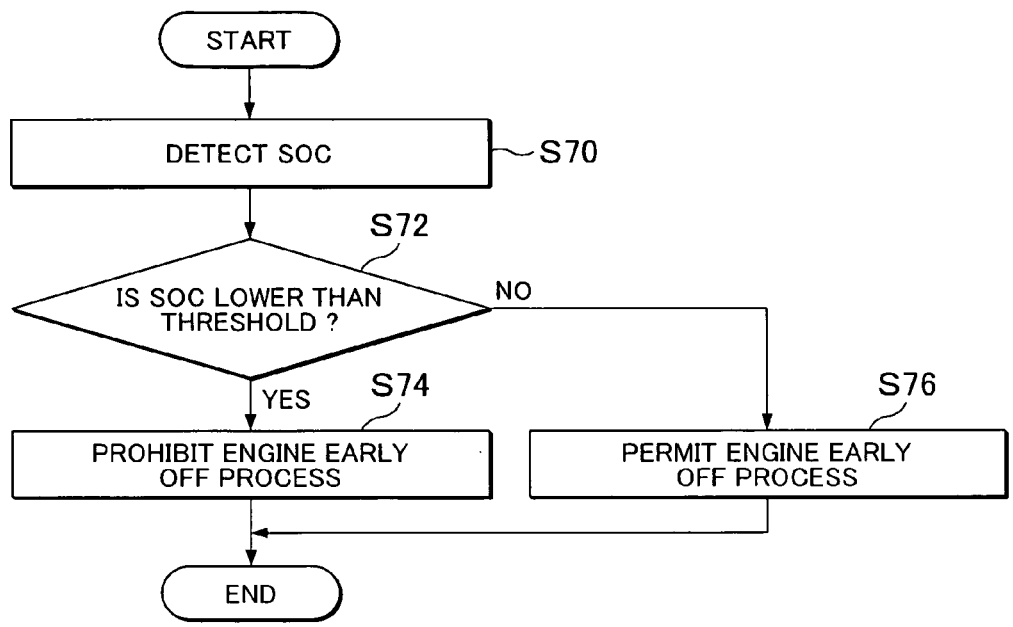
FIG. 12 is a flowchart that shows an example of control that is executed by the ECU.

The driving assistance apparatus 1 may determine whether to establish a state where the engine early off signal is allowed to be output on the basis of the state of charge of the battery 9. That is, the driving assistance apparatus 1 may determine whether to execute the process of changing the engine on threshold and the engine off threshold when it is the timing at which the vehicle is able to reach the target stopping position in a state where driving force is not generated on the basis of the state of the battery 9. FIG. 12 is a flowchart that shows an example of control that is executed by the ECU.

The driving assistance apparatus 1 detects the SOC of the battery 9 in step S70, and determines in step S72 whether the SOC is lower than a threshold. That is, the driving assistance apparatus 1 determines whether the SOC is lower than the preset threshold. When the driving assistance apparatus 1 determines in step S72 that the SOC is lower than the threshold (Yes), the driving assistance apparatus 1 prohibits the engine early off process in step S74. Specifically, the driving assistance apparatus 1 prohibits output of the engine early off request from the engine early off determination unit 64 to the engine on/off determination unit 68. When the driving assistance apparatus 1 executes the process of step S74, the driving assistance apparatus 1 ends the process. When the driving assistance apparatus 1 determines in step S72 that the SOC is not lower than the threshold (No), the driving assistance apparatus 1 permits the engine early off process in step S76. Specifically, the driving assistance apparatus 1 permits output of the engine early off request from the engine early off determination unit 64 to the engine on/off determination unit 68. When the driving assistance apparatus 1 executes the process of step S76, the driving assistance apparatus 1 ends the process.

As shown in FIG. 12, the driving assistance apparatus 1 changes whether to execute the engine early off process on the basis of the SOC. Thus, the driving assistance apparatus 1 is able not to execute the engine early off process when the SOC is lower than the threshold. The driving assistance apparatus 1 does not execute the engine early off process, that is, the driving assistance apparatus 1 allows the engine to be easily kept in the on state, when the SOC is lower than the threshold. Thus, the driving assistance apparatus 1 is able to increase the deceleration at the time of deceleration as compared to that at the time of the engine early off process. Thus, it is possible to make the battery 9 be easily charged through regenerative brake, so it is possible to recover the SOC in a short period.

Figure 13:
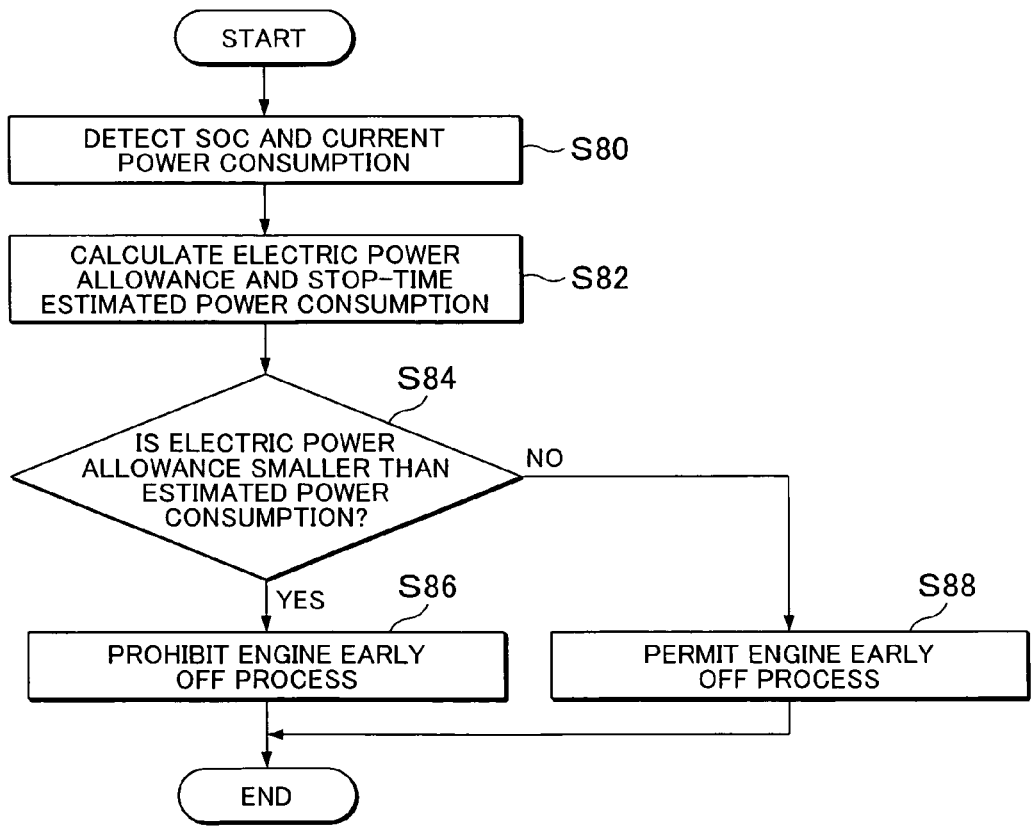
FIG. 13 is a flowchart that shows an example of control that is executed by the ECU.

The driving assistance apparatus 1 may carry out determination further in consideration of a power consumption during a stop. FIG. 13 is a flowchart that shows an example of control that is executed by the ECU. The driving assistance apparatus 1 detects the current power consumption in addition to the SOC of the battery 9 in step S80, and calculates an electric power allowance and a stop-time estimated power consumption in step S82. Here, the electric power allowance is an electric power that is outputtable until the current SOC decreases to the threshold (that is, lower limit) SOC, and is allowed to be calculated by (Capacity of Battery 9)×(Current SOC−Threshold SOC). The stop-time estimated power consumption is an electric power that is consumed during a stop at the target stopping position, and is allowed to be calculated by (Current Power Consumption)×(Stop Time).

When the driving assistance apparatus 1 calculates the electric power allowance and the stop-time estimated power consumption in step S82, the driving assistance apparatus 1 determines in step S84 whether the electric power allowance is lower than the estimated power consumption. That is, the driving assistance apparatus 1 determines whether the electric power allowance is smaller than the estimated power consumption. When the driving assistance apparatus 1 determines in step S84 that the electric power allowance is smaller than the estimated power consumption (Yes), the driving assistance apparatus 1 prohibits the engine early off process in step S86, and ends the process. When the driving assistance apparatus 1 determines in step S84 that the electric power allowance is not smaller than the estimated power consumption (No), the driving assistance apparatus 1 permits the engine early off process in step S88, and ends the process.

The driving assistance apparatus 1 changes whether to execute the engine early off process on the basis of the electric power allowance and the estimated power consumption as shown in FIG. 13. Thus, the driving assistance apparatus 1 is able not to execute the engine early off process when the electric power allowance is smaller than the estimated power consumption. The driving assistance apparatus 1 does not execute the engine early off process, that is, the driving assistance apparatus 1 allows the engine to be easily kept in the on state, when the electric power allowance is smaller than the estimated power consumption. Thus, the driving assistance apparatus 1 is able to increase the deceleration at the time of deceleration as compared to that at the time of the engine early off process. Thus, it is possible to make the battery 9 be easily charged through regenerative brake, so it is possible to increase the electric power allowance, and it is possible to set the electric power allowance so as to be larger than the estimated power consumption.

The driving assistance apparatus according to the above-described embodiment of the invention is not limited to the above-described embodiments, and may be modified in various forms within the scope recited in the appended claims. The driving assistance apparatus according to the present embodiment may be configured by combining the components of the above-described embodiments as needed.

In the above description, the driving assistance apparatus outputs driving assistance information for guiding the accelerator off operation or the brake on operation in visual information; however, the driving assistance apparatus is not limited to this configuration. The driving assistance apparatus may be, for example, configured to output driving assistance information in audio information, tactile sense information, or the like, and may be configured to change the mode of these audio information or tactile sense information as needed.

The driving assistance apparatus 1 according to the present embodiment uses the millimeter wave sensor 16 as preceding vehicle detection means for detecting a preceding vehicle (vehicle ahead); however, the driving assistance apparatus 1 is not limited to this configuration. The preceding vehicle detection means may be a camera that acquires an image ahead of the vehicle 2. The driving assistance apparatus 1 may detect a preceding vehicle ahead in the traveling direction by analyzing an image acquired by the camera. The driving assistance apparatus 1 does not need to execute the process of correcting the residual distance on the basis of the detected result of the preceding vehicle detection means.

The driving assistance apparatus 1 according to the present embodiment is described in the case of assisting the vehicle 2, including the engine 5 and the motor generator 6, so-called hybrid vehicle, in traveling; however, the driving assistance apparatus 1 is not limited to this configuration. The driving assistance apparatus may carry out similar assistance when no motor generator 6 is provided as a power source and the vehicle 2 including only the engine 5 as a power source, so-called conventional vehicle, is assisted in traveling. In this case, the driving assistance apparatus just needs to carry out coasting in a state where the engine 5 is set in the off state. Thus, the driving assistance apparatus carries out traveling to the stopping position. In this way, with the configuration including only the engine 5 as the power source, when the driving assistance apparatus 1 sets the engine 5 to the off state by carrying out similar assistance to that of the above. Thus, it is possible to further reduce a load on the engine 5, so it is possible to improve fuel economy.

DESCRIPTION OF REFERENCE NUMERALS 1 driving assistance apparatus
2 vehicle
3 vehicle control system
4 HMI device (assistance device)
5 engine (internal combustion engine)
6 motor generator, MG (electric motor)
13 GPS
14 wireless communication device
15 database
50 ECU (assistance control device)
51 first information computing unit
52 second information computing unit
53 third information computing unit
54 vehicle control unit
55 power deficiency determination unit
56 CAN
60 accelerator off guiding HMI determination unit
62 engine brake increase determination unit
64 engine early off determination unit
66 driver model calculation unit
68 engine on/off determination unit

The invention claimed is:

1. A driving assistance apparatus that assists a vehicle, including an engine, in traveling, comprising:
an assistance control unit determining an on/off state of the engine; and
a drive control unit controlling driving of the engine on the basis of the on/off state determined by the assistance control unit, wherein
the assistance control unit acquires a quantity of power requested by a driver and switches the engine from the on state to the off state when the quantity of power is lower than or equal to a first threshold for setting the engine to the off state,
the assistance control unit determines whether the vehicle stops at a target stopping position, and
the assistance control unit sets the first threshold higher than a predetermined value when the assistance control unit determines that the vehicle stops at the target stopping position and the vehicle is able to reach the target stopping position without generating a driving force.

2. The driving assistance apparatus according to claim 1, wherein the assistance control unit calculates a position at which the assistance control unit sets the first threshold to the higher value with reference to a position at which the vehicle is able to reach the target stopping position by coasting.

3. The driving assistance apparatus according to claim 2, wherein the assistance control unit calculates the position at which the vehicle is able to reach the target stopping position by coasting on the basis of a current vehicle speed, a deceleration during coasting, and a distance to the target stopping position.

4. The driving assistance apparatus according to claim 1, wherein the assistance control unit detects an accelerator operation state and detects the quantity of power on the basis of the accelerator operation state.

5. The driving assistance apparatus according to claim 1, wherein the assistance control unit determines that the vehicle is able to reach the target stopping position without generating the driving force based upon passage of a position at which the vehicle is able to reach the target stopping position by coasting.

6. The driving assistance apparatus according to claim 1, wherein the assistance control unit determines that the vehicle is able to reach the target stopping position without generating the driving force under a condition that the vehicle travels by coasting to a brake deceleration start position at which braking is started before the target stopping position.

7. The driving assistance apparatus according to claim 1, wherein
the vehicle includes a motor generator that serves as a driving source and a battery that supplies electric power to the motor generator, and
the assistance control unit does not set the first threshold higher than the predetermined value when a state of charge of the battery is lower than a second threshold.

8. A driving assistance apparatus that assists a vehicle, including an engine, in traveling, comprising:
circuitry configured to:
determine an on/off state of the engine;
control driving of the engine on the basis of the determined on/off state;
acquire a quantity of power requested by a driver;
switch the engine from the on state to the off state when the quantity of power is lower than or equal to a first threshold for setting the engine to the off state,
determine whether the vehicle stops at a target stopping position; and
set the first threshold higher than a predetermined value when it is determined that the vehicle stops at the target stopping position and the vehicle is able to reach the target stopping position without generating a driving force.

9. The driving assistance apparatus according to claim 8, wherein the circuitry is further configured to calculate a position at which the first threshold is set to the higher value with reference to a position at which the vehicle is able to reach the target stopping position by coasting.

10. The driving assistance apparatus according to claim 9, wherein the circuitry is further configured to calculate the position at which the vehicle is able to reach the target stopping position by coasting on the basis of a current vehicle speed, a deceleration during coasting, and a distance to the target stopping position.

11. The driving assistance apparatus according to claim 8, wherein the circuitry is further configured to detect an accelerator operation state and detect the quantity of power on the basis of the accelerator operation state.

12. The driving assistance apparatus according to claim 8, wherein the circuitry is further configured to determine that the vehicle is able to reach the target stopping position without generating the driving force based upon passage of a position at which the vehicle is able to reach the target stopping position by coasting.

13. The driving assistance apparatus according to claim 8, wherein the circuitry is further configured to determine that the vehicle is able to reach the target stopping position without generating the driving force under a condition that the vehicle travels by coasting to a brake deceleration start position at which braking is started before the target stopping position.

14. The driving assistance apparatus according to claim 8, wherein
    the vehicle includes a motor generator that serves as a driving source and a battery that supplies electric power to the motor generator, and
    the circuitry is further configured to not set the first threshold higher than the predetermined value when a state of charge of the battery is lower than a second threshold.

\* \* \* \* \*